United States Patent
Saxena et al.

(10) Patent No.: US 11,243,502 B2
(45) Date of Patent: Feb. 8, 2022

(54) INTERACTIVE ENVIRONMENTAL CONTROLLER

(71) Applicant: BrainofT Inc., Redwood City, CA (US)

(72) Inventors: Ashutosh Saxena, San Mateo, CA (US); Brendan Berman, Redwood City, CA (US); Jinjing Zhou, Mountain View, CA (US); Maurice Chu, Redwood City, CA (US)

(73) Assignee: BrainofT Inc., Redwood City, CA (US)

( * ) Notice: Subject to any disclaimer, the term of this patent is extended or adjusted under 35 U.S.C. 154(b) by 23 days.

(21) Appl. No.: 16/927,743

(22) Filed: Jul. 13, 2020

(65) Prior Publication Data

US 2020/0341436 A1 Oct. 29, 2020

Related U.S. Application Data

(63) Continuation of application No. 15/422,215, filed on Feb. 1, 2017, now Pat. No. 10,739,733.

(51) Int. Cl.
*G05B 13/02* (2006.01)

(52) U.S. Cl.
CPC .................. *G05B 13/0265* (2013.01)

(58) Field of Classification Search
None
See application file for complete search history.

(56) References Cited

U.S. PATENT DOCUMENTS

2014/0354527 A1* 12/2014 Chen ................. H04M 1/72454
345/156
2017/0234562 A1* 8/2017 Ribbich ............. G05D 23/1923
700/277

* cited by examiner

*Primary Examiner* — Carlos R Ortiz Rodriguez
(74) *Attorney, Agent, or Firm* — Shun Yao; Park, Vaughan, Fleming & Dowler LLP

(57) ABSTRACT

Sensor information is received. Based at least in part on at least one state detected using the sensor information, an expected value for automatically performing an action associated with a device controlled by a device controller system is evaluated as compared to an expected value for potentially performing, subject to a user interactive qualification, the action associated with the device controlled by the device controller. It is determined that the expected value of automatically performing the action is insufficient to trigger automatically performing the action without being subject to the user interactive qualification. A confirmatory indication is identified. Based at least in part on the confirmatory indication, an instruction is sent to the device to perform the action.

20 Claims, 16 Drawing Sheets

INTERACTIVE ENVIRONMENTAL CONTROLLER

RELATED APPLICATION

This application is a continuation of U.S. application Ser. No. 15/422,215, entitled "INTERACTIVE ENVIRONMENTAL CONTROLLER," by inventors Ashutosh Sexena, Brendan Berman, Jinjing Zhou, and Maurice Chu, filed Feb. 1, 2017.

BACKGROUND OF THE INVENTION

Network connected devices (e.g., Internet of Things (i.e., IoT) devices) allow remote control and automation of the devices within an environment (e.g., home). However, these devices are often not capable of being fully autonomous. Often users must manually operate the devices in a remote control fashion, or users manually create complex rules that try to mimic desired operations. For example, the user must be aware of where devices are specifically located, the capability/range of the device, and how each device will specifically impact the surrounding environment as it relates to a desired result.

BRIEF DESCRIPTION OF THE DRAWINGS

Various embodiments of the invention are disclosed in the following detailed description and the accompanying drawings.

DETAILED DESCRIPTION

Figure 1A:
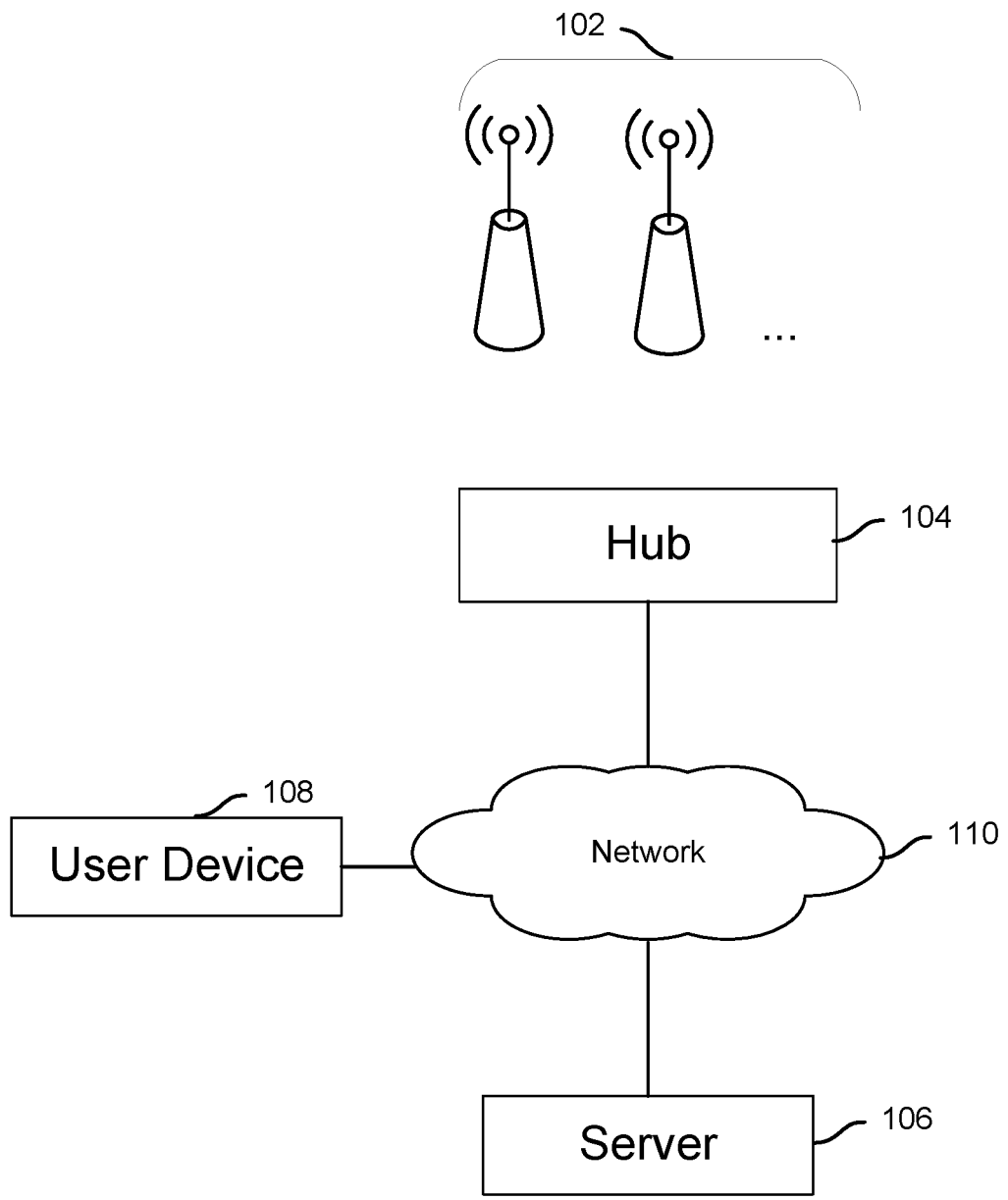
FIG. 1A is a diagram illustrating an embodiment of a system for automatically controlling network devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An interactive device controller is disclosed. For example, network connected smart devices of a deployment environment are controlled autonomously using a controller hub that anticipates needs of a user and automatically controls smart devices without requiring the user to manually operate a complex set of the smart devices in a remote control fashion. The controller hub may anticipate needs of the user by applying machine learning, specified preferences of the user, and/or automation rules to detected sensor inputs (e.g., inputs from camera, microphone, motion detector, etc.). However in certain situations, it may be difficult to definitively determine that an action to control a smart device (e.g., turn on a lightbulb) should be performed. For example, it may be difficult to definitively determine a state of a user (e.g., current action being performed by a user) given sensor inputs (e.g., camera image) when the action is triggered by the state of the user. In some embodiments, rather than simply perform or not perform the action, the user is prompted to confirm whether the action should be performed. For example, the action has been automatically identified (e.g., user has not specifically requested that the action be performed but the system has automatically identified the action as desirable) by the system to be potentially performed in anticipating needs of the user. However because the system is not sufficiently sure the action should be performed given the uncertainty in analysis results of sensor inputs, the system prompts the user via an audio output of a speaker whether the system should perform the action. If the user confirms that the action should be performed, the action is performed.

In some embodiments, sensor information about one or more states of an environment is received. For example, sensors are located in an enclosed physical location (e.g., home, building, etc.) and sensor inputs are received for analysis to determine various states of the environment (e.g., state of devices, temperature, humidity, brightness, motion, states of one or more humans or animals in the environment, etc.). In some embodiments, one or more states are associated with a measure of certainty that the state is correct based on the received sensor inputs.

Based at least in part on the states detected using sensor information, an expected value for automatically performing an action as compared to an expected value for potentially performing the action is evaluated. For example, the expected value is a measure of a degree of desirability associated with the option. The expected value is specific to the particular associated action. The expected value may take into consideration potential benefit of choosing an associated option for the action given the input states, potential harm of not choosing the associated option for the action given the input states, a history of past option selections for the action, annoyance to a user for choosing the associated option, etc. among other factors. In some embodiments, an expected value is determined for each output handling type for the action given the determined state(s). These output handling types may include automatically performing the action (e.g., not subject to a user interactive qualification), determining that the action should be potentially performed subject to the user interactive qualification, and not performing the action. The user interactive qualification may be associated with inquiring a user whether the action should be performed and only performing the action if the user provides a confirmatory indication. In another example, the user interactive qualification may be associated with providing warning that the action will be performed unless otherwise instructed and not performing the action if instructed otherwise. The user interactive qualification may be a prequalification of performing the action and a qualification indication from a user may allow or prevent execution of the action.

In some embodiments, not performing the action is associated with waiting to perform the action because a user will likely manually perform the action. In some embodiments, the evaluating the expected values includes comparing the expected values associated with each output handling type associated with a particular action to select the expected value (e.g., highest or lowest value) that corresponds to the most desirable result.

In some embodiments, in the event it is determined that the expected value of automatically taking the action is insufficient to trigger automatically performing the action without being subject to the user interactive qualification, a user is provided an interactive inquiry to request a response from the user on whether the action should be performed or prevented from being performed.

FIG. 1A is a diagram illustrating an embodiment of a system for automatically controlling network devices. Devices 102 include one or more network connected devices including sensor devices and controllable devices (e.g., IoT devices). Examples of one or more controllable devices included in devices 102 include a switch, a door lock, a thermostat, a light bulb, a kitchen/home appliance, a camera, a speaker, a garage door opener, a window treatment (e.g., roller shades, curtains, etc.), a fan, an electrical outlet, an audio/visual device, a light dimmer, an irrigation system, a pet feeder, and any other device able to be connected to a computer network. Examples of one or more sensor devices included in devices 102 include a switch, a camera, a motion detector, a light detector, an accelerometer, an infrared detector, a thermometer, an air quality sensor, a smoke detector, a microphone, a humidity detector, a door sensor, a window sensor, a water detector, a glass breakage detector, a power utilization sensor, and any other sensor.

Hub 104 communicates with devices 102 via a wired and/or wireless connection. For example, a device of devices 102 communicates with hub 104 via a communication interface configured to utilize WiFi, Bluetooth, Bluetooth Low Energy, Zigbee, Z-Wave, power-line communication, Ethernet, and/or any other wireless or wired communication protocol. In some embodiments, hub 104 and devices 102 have been deployed in the same environment. For example, devices 102 include devices that have been deployed in a home and hub 104 wirelessly communicates with the devices within the home via a short range wireless signal. In some embodiments, hub 104 facilitates communication and/or control of devices 102 with user device 108 and/or via network 110. For example, user device 108 connects to hub 104 via a direct wireless connection (e.g., Bluetooth, Wifi, etc.) and/or via network 110 to control and view information about a device of devices 102. In another example, user device 108 connects to network 110 to access devices 102 via hub 104 and/or server 106. In some embodiments, one or more devices/sensors of devices 102 report information to hub 104 that in turn provides the reported information to server 106 via network 110 for processing. In some embodiments, one or more devices and/or sensors of devices 102 directly communicate with network 110 without being routed via hub 104. For example, a device includes a Wifi and/or cellular radio to directly access network 110.

Examples of user device 108 include a laptop computer, a smartphone, a tablet computer, a desktop computer, a wearable device, a smartwatch, and any other electronic computing device of a user. In some embodiments, information from user device 108 is provided to server 106 and/or hub 104 to enable automation of devices 102. For example, a GPS location detected by user device 108 is provided to hub 104 and/or server 106 as a sensor input to determine and/or trigger device automation rules. In some embodiments, information associated with a device of devices 102 is provided to user device 108. For example, a detected alert of a device of devices 102 is provided to user device 108 via hub 104 and/or server 106. Server 106 may be a part of a cloud computing infrastructure to process and/or store information associated with devices 102 to enable control and management of devices 102. In some embodiments, hub 104 functions as an interface and a control hub to automatically control devices 102. Although storage elements have not been explicitly shown in FIG. 1A, any of the shown components may include a local storage and/or access a locally connected and/or remote storage. For example, a local and/or remote storage stores an environment graph model that maps relationships among devices 102 and the physical deployment environment.

In some embodiments, using the system shown in FIG. 1A, machine learning is performed to automatically learn how users want to interact with one or more controllable devices of devices 102 to autonomously and automatically adjust properties of the controllable devices. In some embodiments, powerful statistical models of user preferences and behaviors are automatically built. For example, sensors of devices 102 and user device 108 are utilized along with the environment graph model to learn about a user's presence, activities, and behavioral preferences. Controllable devices of devices 102 may be automatically managed and controlled based on the learned data. For example, rather than simply using controllable devices of devices 102 in a remote control fashion by requiring a user to explicitly provide control commands or user defined control rules, devices are automatically controlled based on learned user preferences without explicit user triggering of the devices.

In some embodiments, machine learning (e.g., local and/or cloud-based) is utilized to integrate input from many different devices/sensors (e.g., devices 102) to build a unique model of a user's presence, activities, and behavior. For example, an environment such as home is installed with devices 102 that can be controlled remotely or locally. The sensors of devices 102 may provide data about the presence and motion of people in an environment, measurements of the environmental properties such as light, temperature and humidity of the house, motion of subjects, and video of different locations of the environment. The machine learning may take into account the graph model to account for locational, functional, and behavior properties of the devices/sensors and their data during the learning process.

In some embodiments, learning is performed to learn how to automatically control the controllable devices and automatically adjust the controllable devices of devices 102 to match the automatically determined preferences of the users. For example, sensors detect the environmental conditions that trigger changes in the controllable device states (e.g., behavior and interaction with switches, thermostats, and other devices) and the environmental conditions are given context using the graph model, and devices of devices 102 are commanded autonomously in accordance with automatically learned preferences of the users.

In some embodiments, machine learning is performed for a particular environment by a local hub. For example, hub 104 performs learning for the users of its deployed environment including devices 102 using a graph model of the environment. In some embodiments, rather than performing machine learning at a local hub, at least a portion of the machine learning is performed remotely (e.g., cloud-based). For example, machine learning for the environment of hub 104 is performed by server 106 that is aware of the graph model of the local environment. In some embodiments, a backend server performs learning across various different environments and utilizes the result to aid in automatically configuring each local environment. For example, a graph model includes a hierarchy of nodes that represent and connect together various local environments (e.g., graph model of a building includes node elements for individual units of the building) and learning is performed across the entire graph of various local environments.

In some embodiments, hub 104 and/or server 106 includes one or more inference engines that convert sensor data received from one or more devices of devices 102 into state representations (e.g., state of a person's behavior, location, etc.). For example, the inference engine utilizes machine learning algorithms that rely on statistical and/or deep learning techniques. In some embodiments, hub 104 and/or server 106 includes a "vision engine" (e.g., ML Inference) that receives images/video from one or more camera sensors and analyzes the images/video using vision algorithms to infer a subject's (e.g., human, pet, etc.) location, behavior, and activities (e.g., spatial and motion features). In some embodiments, camera video data is analyzed to learn hand gestures of a person that control connected devices to a desired state. In one embodiment, the gestures are learned from statistical demonstrations by the person. In one embodiment, the gestures are learned using deep learning. In some embodiments, output of vision data and the data from other sensor devices are utilized to build a semantic representation containing information about a person's presence, activities, and behavioral preferences. State information may be given context using the graph model and higher level information about one or more states may be extrapolated using the graph model.

In some embodiments, in the system shown, the data is sent using an event-driven database architecture. For example, the sensor data is first converted into a compact feature vector before streaming. In some embodiments, the sensor data is cleaned, before streaming, by statistical learning models that model the different types of noise in the system.

In some embodiments, hub 104 and/or server 106 includes one or more "rule engines" that utilize a detected state to trigger one or more automatically determined automation rules. For example, the rule engine consists of rules with pre-conditions and post-conditions and if a certain pre-condition state of the environment is detected, a rule is triggered to cause one or more network connected controllable devices to be placed in the post-condition state. For example, if it is detected that a person is reading a book on a desk, then the system will turn on reading lights. The pre-conditions of a rule may be based on one or more properties of the graph model.

In some embodiments, server 106 stores various types of information that can be utilized to automatically determine automation rules. For example, sensor data at various points in time as well as device control events of devices 102 (e.g., pressing a light switch, changing a temperature of a thermostat, etc.) are logged. By learning the preferences/configurations desired by users, the preferences/configurations may be recreated when the conditions in the environment match the previously recorded conditions. In some embodiments, statistical models (e.g., transition model) of the control action of devices are determined. For example, when a network connected light bulb is turned on or off, the associated environmental conditions (e.g., user location, action, time of day, etc.) and associated controllable device status are stored. In some embodiments, which state vector maps to which control action of controllable devices is learned. In some embodiments, a learning method learns the weight of a function that maps the value of the state vector to the state change of controllable devices. In some embodiments, a learning method uses deep learning in order to learn a multi-staged non-linear mapping from the state vector to the state changes of controllable devices. In some embodiments, feedback from the user regarding an action of an automatically triggered rule is received in the form of a reward, and reinforcement learning is used to automatically modify the control rule. In some embodiments, server 106 stores the graph model for one or more deployment environments.

In some embodiments, certain alarming or important events are detected and the data is stored. For example, a break-in is detected as an unusual event, and in response, output alerts are generated including an alert that is sent to a smartphone and activation of a siren. In another example, a baby climbing out of a crib is detected. Unlike manually set alarms, the automatically detected unusual events may be detected based on statistical modeling of events using sensor data.

In some embodiments, in response to detecting an event, an output response (e.g., sound, user alert, light alert, wearable alert, etc.) is generated. For example, when it is detected that a stove is left on beyond a threshold amount of time and/or when no human subject is detected as present, the stove is automatically turned off and/or an output alert is generated. In another example, when a water leak is detected, an automatic output alert is sent and a water valve is automatically turned off. In another example, when it is detected that a person has fallen and further movement of the person is not detected, an alert to an emergency contact person and/or an emergency authority is automatically sent. In another example, if a presence of a person is detected in a living room during morning times, curtains are automatically opened. In another example, if it is detected that humidity is above a threshold value, a fan is automatically turned on. In another example, a humidifier is automatically switched on/off to maintain a preferred humidity. In another example, when a learned preferred time is reached, a coffee maker is automatically turned on. In another example, a dishwasher is automatically scheduled to be operated at a time when energy rates are relatively lower. In another example, light intensity is automatically adjusted based on a time of day (e.g., lights turned on a lower intensity when a subject wakes up in the middle of the night to use the bathroom.). In another example, music is automatically turned on when it is detected that a subject is eating dinner. In another example, when it is detected that ambient temperature and humidity are above threshold values and a subject is detected as sitting, a fan is automatically turned on.

In certain situations, it may be difficult to definitively determine that an action (e.g., change a property of a device) to control a device (e.g., controllable device of device 102) should be performed. For example, it may be difficult to definitively determine input states (e.g., states in a state vector) given sensor inputs. Thus, if the output of an evaluation of an automation rule is simply to change or not change a property of a controllable device, uncertainty of environmental states provided to the automation rule may result in either a property of the controllable device being changed when it is not desirable to be changed (e.g., undesirably aggressive triggering of change) or a property of the controllable device being not changed when it is desirable to be changed (e.g., undesirably conservative triggering of change). In some embodiments, rather than an evaluation of an automation rule simply resulting in performing and not performing the action, the user is prompted to interactively confirm or deny triggering of the action if input states to the automation rule cannot be determined with a sufficient level of certainty. For example, hub 104 prompts the user via an audio output of a speaker whether the system should perform the action automatically identified as desirable to be performed. If the user confirms that the action should be performed, the action is performed. Example results of handling an action triggered by an automation rule include: performing the action, providing a warning that the action will be performed then performing the action (e.g., with a user opportunity to cancel performance of the action), inquiring a user whether to perform the action (e.g., only performing the action if the user confirms), determining that the user will likely manually perform the action (e.g., not perform action and wait), and not performing the action.

One or more of the following may be included in network 110: a direct or indirect physical communication connection, mobile communication network, Internet, intranet, Local Area Network, Wide Area Network, Storage Area Network, a wireless network, a cellular network, and any other form of connecting two or more systems, components, or storage devices together. Additional instances of any of the components shown in FIG. 1A may exist. For example, multiple hubs may be deployed and utilized in a single environment. Multiple user devices may also be utilized to receive user associated information and/or control devices of the same environment. Server 106 may be one of a plurality of distributed servers that process network connected device data. In some embodiments, components not shown in FIG. 1A may also exist.

Figure 1B:
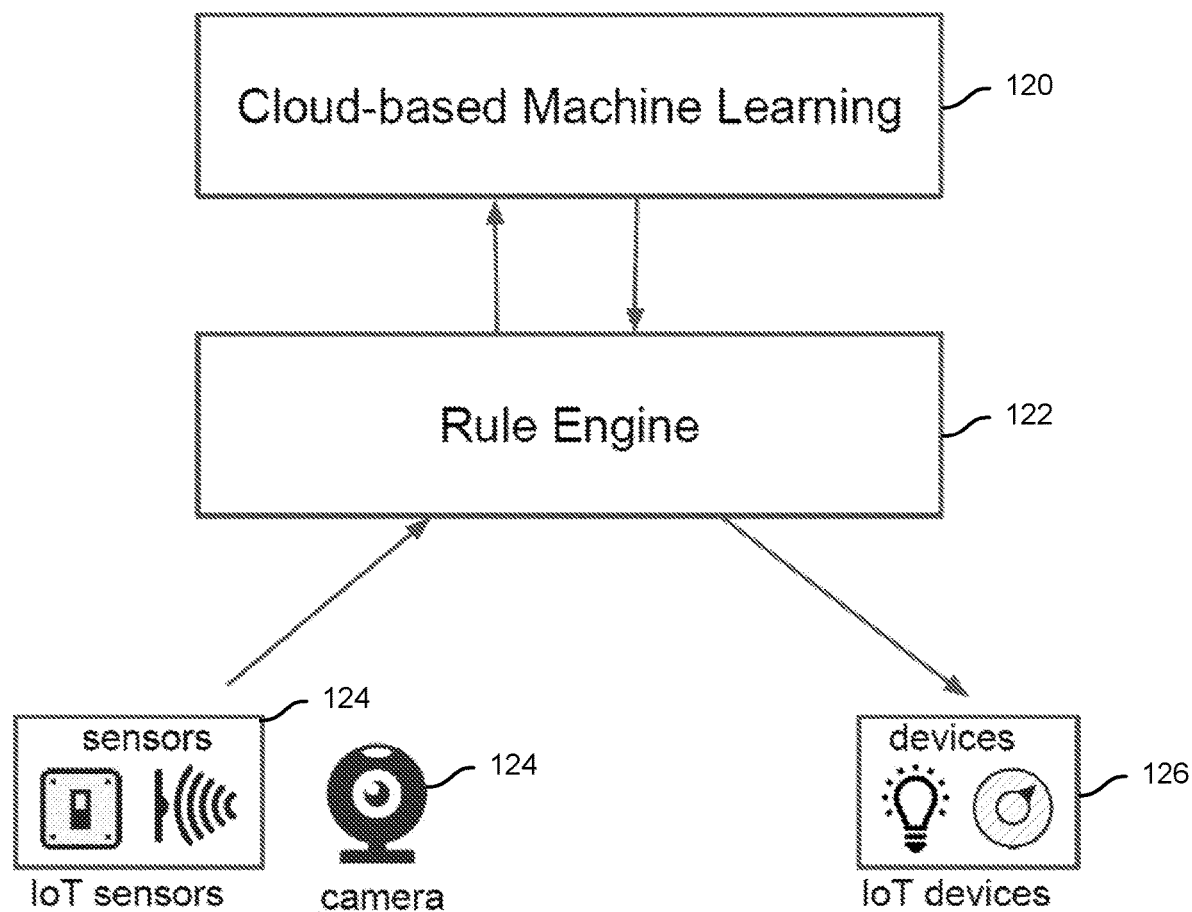
FIG. 1B is a diagram illustrating an embodiment of interactions between components for automatically controlling network devices.

FIG. 1B is a diagram illustrating an embodiment of interactions between components for automatically controlling network devices. Cloud-based machine learning module 120 communicates with rules engine 122. Rules engine 122 receives input from sensors 124 and controls devices 126. Examples of cloud-based machine learning module 120 include one or more modules for performing machine learning discussed in conjunction with FIG. 1A. Examples of rules engine 122 include one or more "rule engines" of hub 104 and/or server 106 of FIG. 1A. Sensors 124 and/or controls devices 126 may be included in devices 102 of FIG. 1A. Cloud-based machine learning module 120 communicating with rules engine 122 may utilize a graph model of the environment including sensors 124 and devices 126 to discover and invoke rules.

Figure 1C:
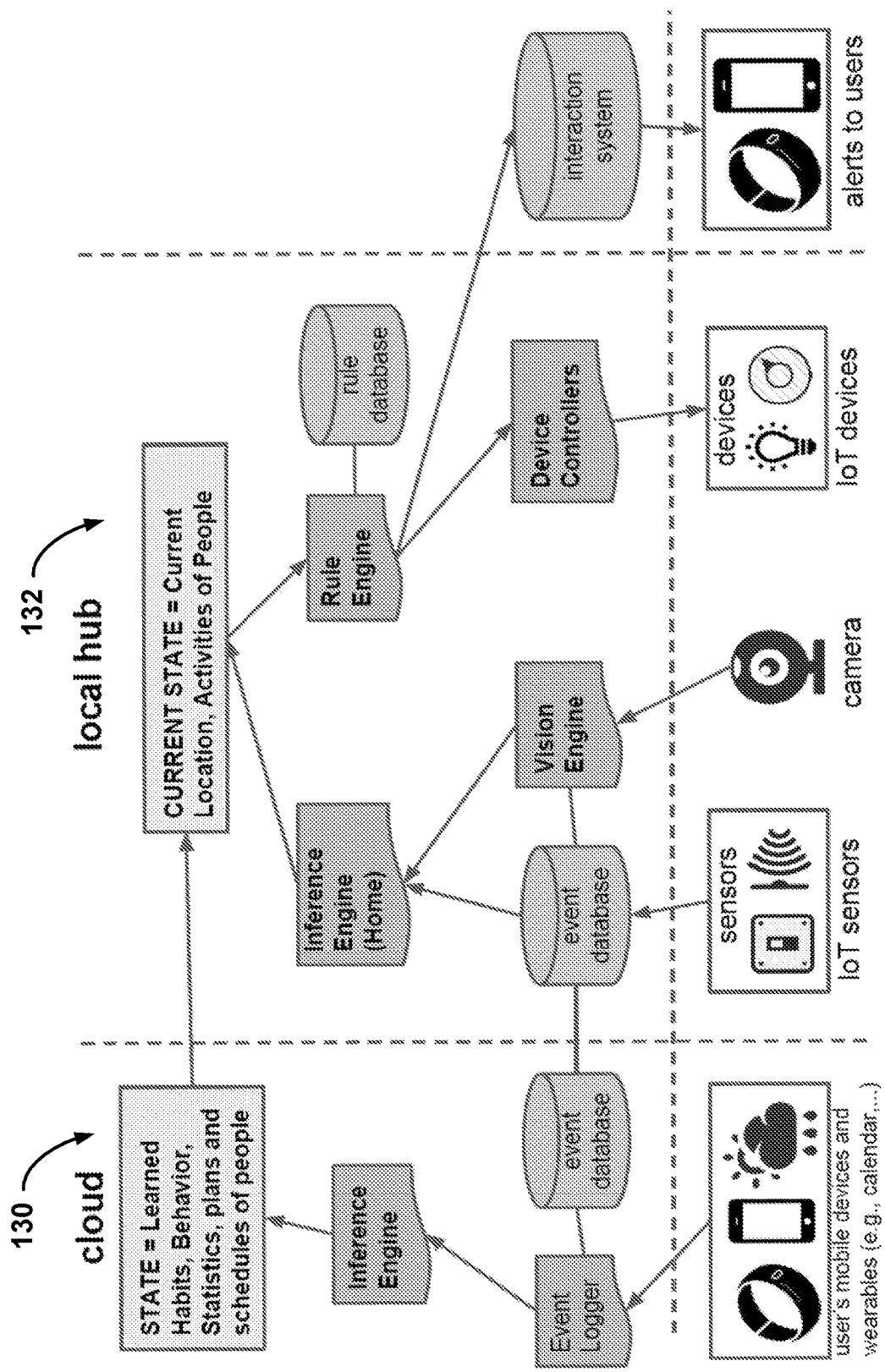
FIG. 1C is a diagram illustrating an embodiment of sub components of a system for automatically controlling network devices.

FIG. 1C is a diagram illustrating an embodiment of sub components of a system for automatically controlling network devices. In some embodiments, components 130 of the cloud shown in FIG. 1C may be included in server 106 of FIG. 1A. In some embodiments, components 132 of the local hub shown in FIG. 1C may be included in hub 104 of FIG. 1A.

Figure 2:
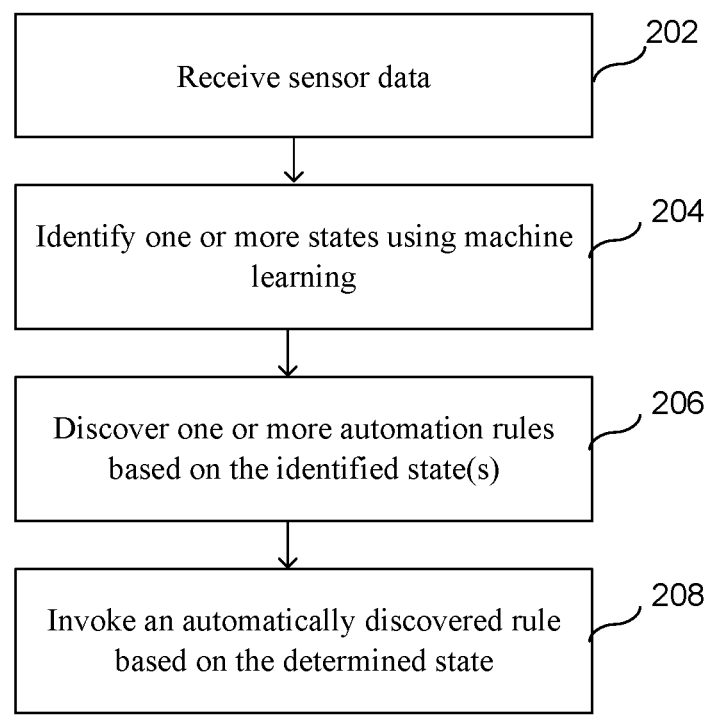
FIG. 2 is a flowchart illustrating an embodiment of a process for automatically learning and applying device control rules.

FIG. 2 is a flowchart illustrating an embodiment of a process for automatically learning and applying device control rules. The process of FIG. 2 may be at least in part performed by hub 104 and/or server 106 of FIG. 1A.

At 202, sensor data is received. In some embodiments, the received sensor data includes data from one or more sensor devices of devices 102 of FIG. 1A. For example, data from a switch, a camera, a motion detector, a light detector, an accelerometer, an infrared detector, a thermometer, an air quality sensor, a smoke detector, a microphone, a humidity detector, a door sensor, a window sensor, a water detector, a glass breakage detector, and any other sensor monitoring an environment is received. In some embodiments, the sensor data includes data from a user device (e.g., user device 108 of FIG. 1A). For example, data from a sensor on the user device (e.g., location sensor, GPS, accelerometer, heart rate sensor, orientation sensor, microphone, gyroscope, etc.) is received. In another example, the data from the user device includes status data and/or user specified data. In some embodiments, the sensor data includes data from one or more controllable devices. For example, a status, a configuration, a functional state, a parameter, and/or any other data of a controllable device of devices 102 of FIG. 1A is received. In some embodiments, the sensor data is received periodically. For example, a sensor device sends currently detected sensor data periodically. In some embodiments, the sensor data is received dynamically. For example, the sensor data is received when sensor data has been detected. In some embodiments, the received sensor data is received from a plurality of sensor devices. In some embodiments, the sensor data is received at a hub (e.g., hub 104 of FIG. 1A) and the sensor data is shared/sent to another hub and/or sent to the computing cloud for processing (e.g., sent to server 106 of FIG. 1A).

At 204, one or more states are identified using machine learning. In some embodiments, machine learning is performed using the received sensor data. In some embodiments, performing machine learning includes utilizing a recursive hidden Markov model and/or expectation maximization. In some embodiments, each state is associated with discrete categories of information desired to be detected using machine learning. For example, an activity currently being performed by a person is desired to be detected among a plurality of possible activities able to be detected. This may be achieved by analyzing camera video/image data to detect a person and activity performed by the person. In some embodiments, a state for each detected subject is determined. In some embodiments, by reducing the sensor data to one or more specific states, the sensor data is reduced to meaningful variable values that can be utilized to determine one or more automation rules. In some embodiments, the state may be in a form of a vector. For example, the state vector includes a grouping of values. In some embodiments, the state vector includes one or more of the following: a time value, a weather forecast, a date value, and other data associated with time and/or environment conditions.

In many cases, it is difficult to determine a specific state with complete accuracy. For example, using the sensor data, it may be difficult to determine the exact location and activity of a subject. In some embodiments, a likelihood/probability that the determined state is correct is determined. For example, a certain state may be one of a plurality of different possible states and the probability that each possible state is the correct state is determined. In some embodiments, in order to determine the probability, machine learning (e.g., statistical and/or deep learning) may be performed. For example, statistical and/or deep learning models of correlations between sensor data and a potential state, a previous state and the potential state (e.g., transition model), and associations between different states/state components are built and utilized to determine an overall likelihood/percentage for each candidate state.

In some embodiments, the observations in time are utilized as statistical inputs and utilized to estimate a state vector evolving in time. The state vector may be the output of an inference engine that converts the sensor data into information about a detected subject presence, activities, etc. In one embodiment, the dynamic processes of the subjects in the house (e.g., human and pet) and their motions are modeled. In one embodiment, deep learning is utilized to learn non-linear relations. In some embodiments, sounds captured from microphone sensors are utilized to infer the number of people, their location, and their activities. In one embodiment, statistical models are utilized to relate sound to the aforementioned state vector.

In some embodiments, a state vector including the activity state (e.g., general activity state—reading, sleeping, cooking, etc. and detailed activity state—reading-opening-book, placing-book-down, etc.) of a subject is estimated. In one embodiment, the state vector includes other relevant information such as time-of-the-day, weather, number of people in the house, subject locations, and current activities being performed. In some embodiments, the state vector includes one or more controllable device states. In some embodiments, the state vector includes a listing of subjects with each region (e.g., room) of an environment. In some embodiments, a learning method learns the weight of a function that maps the values of the sensor data to the state vector. In some embodiments, a learning method utilizes deep learning to learn a multi-staged non-linear mapping from the sensor data to the state vector.

In some embodiments, one or more states are identified using a graph model of the environment. For example, the graph model stored in server 106 and/or hub 104 of FIG. 1A is utilized. An example of the graph model is shown in FIGS. 9A-9D. Because the graph model identifies nodes and relationships between nodes, an identified state and/or detected sensor data can be augmented with context information from the graph model. For example, physical location information about sensors and their relationship to each other and regions of the physical environment can be utilized to infer additional location information of detected sensor data because information of the physical placement of the sensors (e.g., location, orientation, etc.) can be used to provide context on the sensed information. In some embodiments, additional states determined from the graph model are included in the state vector. In some embodiments, the graph model enables states and/or sensor data to be abstracted. For example, sensor data can be generalized to higher level information about regions associated with the type of region where the sensor data was obtained.

In some embodiments, data from the sensors and/or cameras is analyzed in order to predict what activities the person may perform or locations the person may go to. Based on the activity and/or location prediction, anticipatory actions may be taken. For example, if a user starts moving towards a reading desk, it is predicted that the user will go to the reading desk to read and a network connected light will turn on even before the user starts reading.

At 206, one or more automation rules are discovered based on the identified state(s). For example, once it has been observed that an identified state is correlated with a certain controllable device state/status/action, a rule that places the controllable device into the associated state/status/action when the associated state is detected is created. Correlation between a determined state and a detected controllable device state/status/action may be identified and once the correlation reaches a threshold, an automation rule is dynamically created and/or updated. In some embodiments, a correlation between a group of states and/or a range of state values with a controllable device state/status/action is identified and utilized to generate an automation rule. In some embodiments, the probability measure of each state may be utilized when determining the correlations and/or automation rules. In some embodiments, a history of determined states and associated probability values and co-occurring controllable device states/status/actions over time are stored and analyzed using machine learning (e.g., statistical and/or deep learning) to discover correlations. In the event a measure of correlation is above a threshold value, a corresponding automation rule may be created/updated. In some embodiments, automation rules are continually added/updated based on new correlations that are discovered.

In some embodiments, the rules in the rule engine that control the devices are automatically learned. In one embodiment, the rules are formulated as a reinforcement learning problem in order to learn the policy. In one embodiment, the execution of the policy is performed using proportional-derivative controllers. The rule engine may take actions (e.g., changing the state of the devices) based on triggering state vector and sensor information. In one embodiment, parameters of a machine learning algorithm are modified using online stochastic gradient algorithms.

The rule engine may take into account data from a user device, web services, weather services, calendar events, and other data sources to learn and/or trigger rules.

In some embodiments, discovering the one or more automation rules includes utilizing the graph model of the environment. For example, automation rules may be based on specific nodes, area/regions, relationships, and/or edges of the graph model. In some embodiments, the graph model enables more generalized rules to be discovered. For example, without reliable installation location information and/or relationships of devices, only detected sensor/device based rules are discovered. However, with context information from the graph model, more generalized rules that are applicable to general location concepts/descriptions (e.g., kitchen) and/or relationships between devices are able to be discovered. By allowing more generalized rules to be discovered, invoked, and/or utilized, rules become applicable in more situations and locations. For example, a rule specific to a particular user but generalized to a broader area/region may be applied in different environments as the particular user travels to different environments with different graph models but with a same labeled area/region (e.g., rule to turn on lights at night when the user enters a kitchen area can be applied across all kitchens visited by the user even though actual light devices and their configurations are different across different kitchens). In some embodiments, by allowing actions to be generalized to broader concepts using the graph model (e.g., generalized to broader location context), rule discovery may take place across various different types of deployment environments (e.g., by same user and/or different users).

At 208, an automatically discovered rule is invoked based on the determined state. For example, a triggering condition of the automatically discovered rule is the identified state, and the rule is invoked to modify a property (e.g., state/ status/function/action, etc.) of a controllable device to be as specified by the rule. In some embodiments, the triggering condition of the rule is a plurality of different states and/or a range of states. In some embodiments, a plurality of rules is applied/triggered based on the determined state. In some embodiments, the applied rule is inconsistent with another rule to be applied. For example, one rule specifies that a light switch should be turned on while another rule specifies that the light switch should be turned off. In order to resolve conflicts between rules, each rule may be associated with a preference value that indicates a measure of preference of the rule over another rule. In some embodiments, feedback from the user regarding an action of an automatically triggered rule is received in the form of a reward, and reinforcement learning is used to automatically modify the control rule.

In some embodiments, invoking the rules includes utilizing the graph model. For example, one or more triggering conditions and/or desired results are based on elements of the graph model. For example, rather than requiring the condition to refer to a specific device, the condition references a generalized concept that can be identified based on the nodes and edges of the graph model (e.g., "lightbulb #2321" is to be turned on vs. light is to be turned on in the "kitchen").

In some embodiments, an optimization function is utilized to modify a property of a controllable device. For example, at each periodic interval, state inputs are received (e.g., user states, device/sensor states, environmental states, states of 204, etc.) and utilized to select the optimal property setting of the controllable device given the state inputs. This includes utilizing an optimization function (e.g., cost function) to evaluate optimization evaluation values (e.g., learned or specified cost values) of candidate property settings of the controllable device to select and implement the optimal candidate property setting. One or more components of the optimization evaluation values may vary according to one or more dynamic parameters.

Figure 3:
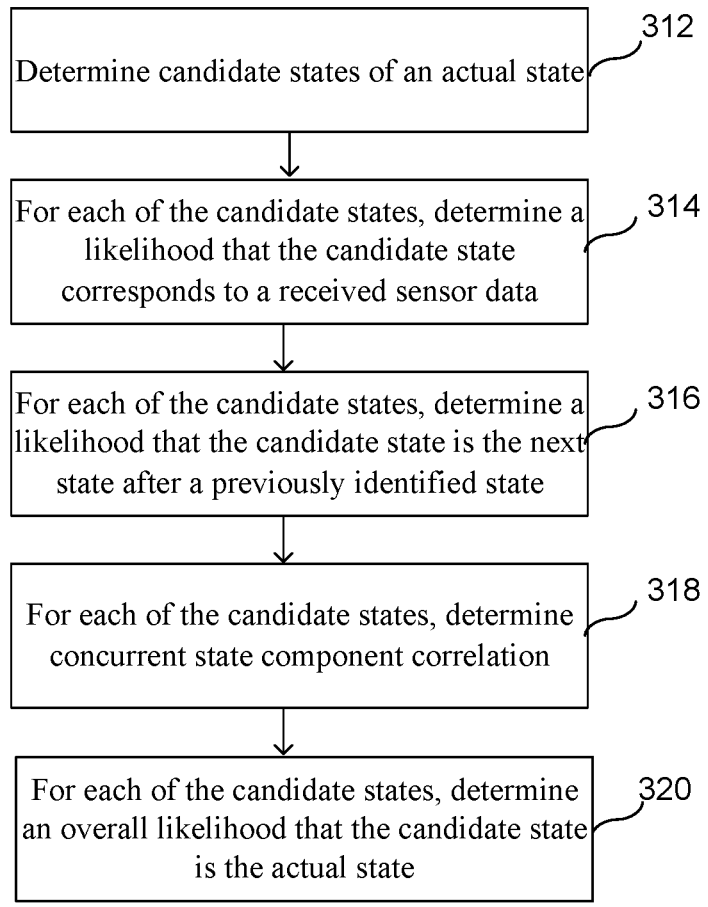
FIG. 3 is a flowchart illustrating an embodiment of a process for determining a likelihood that a detected state is the correct state.

FIG. 3 is a flowchart illustrating an embodiment of a process for determining a likelihood that a detected state is the correct state. The process of FIG. 3 may be at least in part implemented on hub 104 and/or server 106 of FIG. 1A. In some embodiments, the process of FIG. 3 is included in 204 of FIG. 2. In some embodiments, the process of FIG. 3 is performed periodically. In some embodiments, the process of FIG. 3 is performed dynamically. For example, the process of FIG. 3 is performed when new sensor data is received.

At 312, candidate states of an actual state are determined. For example, candidate states that may correspond to a newly received sensor data are identified. In some embodiments, the candidate states are possible states of an actual current state of a subject (e.g., human, animal, pet, robot, other living or non-living object, etc.). For example, because the exact current state (e.g., location and activity currently being performed) of a subject may be difficult to determine from sensor data with complete accuracy, candidates states (e.g., each candidate state including a location component and an activity component) for a subject are identified.

In some embodiments, determining the candidate states includes identifying all possible states that can be associated with the received sensor data. For example, all possible predefined activities of a subject that can be identified using data from a camera are identified. In some embodiments, determining the candidate states includes identifying the most likely candidate states. For example, rather than identifying all possible states, the most likely candidate states are identified. In some embodiments, the most likely candidate states are identified by analyzing associated sensor data received in 202 of FIG. 2. In some embodiments, determining the candidate states includes identifying a subject associated with newly received sensor data and identifying the last determined state for the subject. In some embodiments, the most likely candidate states are identified based on a previous current state. For example, for a given previous state (e.g., a location of a subject), only certain states are eligible to become the new current state (e.g., only locations adjoining the previous location) and these states are identified.

In some embodiments, a single state includes a plurality of sub states. In some embodiments, each state includes an identifier of a subject, a coarse location of the subject (e.g., which room of a house/building), a specific location of the subject within the coarse location (e.g., on the bed of a bedroom), whether the subject is present within an environment, a type of the subject (e.g., human vs. pet, specific individual, etc.), a coarse activity of the subject (e.g., reading), and the specific activity of a subject (e.g., opening a book). In some embodiments, each candidate state includes a state of a controllable object. In some embodiments, an activity state of a subject is one of predefined activities that can be detected (e.g., detected based on observed/training data).

In some embodiments, determining the candidate states includes identifying states based on a graph model (e.g., graph model shown in FIGS. 9A-9D). For example, received sensor data is given context and information related to the sensor data is identified based on the graph model (e.g., information/properties of edges connected to the node of the sensor that detected the data and information/properties of other nodes connected to the node of the sensor). Possible states may be identified and/or eliminated based on the graph model.

At 314, for each of the candidate states, a likelihood that the candidate state corresponds to a received sensor data is determined. For example, a probability that a received sensor data corresponds to a particular candidate state is determined. In some embodiments, the likelihood identifies a probability that the candidate state is the actual state given the sensor data. In some embodiments, this likelihood is determined using machine learning. For example, statistical and/or deep learning processing has been utilized to analyze a training data set of example associations between different sensor data and corresponding states to determine associated probabilities of association between different sensor data and different states. In some embodiments, the likelihood that the candidate state corresponds to the received sensor data is determined using a predetermined analysis algorithm. For example, a computer vision pattern recognition algorithm is utilized to analyze camera sensor data and the algorithm provides the likelihood. In some embodiments, the likelihood is determined using the graph model.

At 316, for each of the candidate states, a likelihood that the candidate state is the next state after a previously identified state is determined. For example, a probability that the candidate state is the actual state after a previously determined state of a subject is determined. In some embodiments, this likelihood is determined using machine learning. For example, statistical and/or deep learning processing has been utilized to analyze observed state transitions between different states to determine a transition model of probabilities for each potential candidate state given a previous state. In one example, a motion detector sensor has been installed in each room of a house. The relative locations of the rooms of the house may be automatically determined by using machine learning to observe the pattern of sensor triggers as subjects move from one room to another room. Once the connections between the rooms are known, given a current room location of a subject, the possible adjoining rooms are known and each likelihood that the subject will visit a next room of the possible connected rooms may be determined. For example, given the previous state that indicates a location of a subject, the next state is limited to adjoining rooms that are reachable given the determined/observed rate of movement of the subject and elapsed time between the sensor data of the states. In some embodiments, the likelihood that the candidate state is the next state is determined using the graph model.

At 318, for each of the candidate states, a concurrent state component correlation is determined. For example, certain candidate state components are more likely included together in the correct state than another grouping of candidate state components. In some embodiments, determining the concurrent state correlation includes determining a probability that one component of the candidate state is included in the correct/actual state given another component of the candidate state. For example, a candidate state includes a location state component and an activity state component, and the probability of the specific activity state component given the specific location state component is determined. In some embodiments, determining the concurrent state correlation includes determining a plurality of probabilities each associated with a different pair combination of state components of the candidate state. In some embodiments, the concurrent state component correlation is determined using the graph model.

At 320, for each of the candidate states, an overall likelihood that the candidate state is the actual state is determined. For example, for each candidate state, the overall probability that the candidate state is the correct state of a subject is determined. In some embodiments, determining the overall state includes multiplying together one or more of the probabilities determined in 314, 316, and 318. For example, at least a first probability that the candidate state corresponds to a received sensor data, and a second probability that the candidate state is the next state after a previously identified state are multiplied together to obtain the overall likelihood. In some embodiments, the candidate states are sorted based on their overall likelihoods and the candidate state with the best overall likelihood is selected as the actual/correct state.

Figure 4:
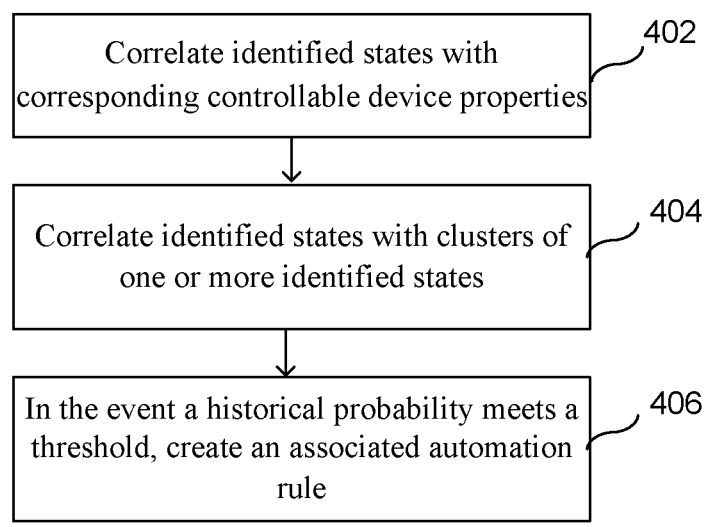
FIG. 4 is a flowchart illustrating an embodiment of a process for automatically discovering an automation rule of a network connected controllable device.

FIG. 4 is a flowchart illustrating an embodiment of a process for automatically discovering an automation rule of a network connected controllable device. The process of FIG. 4 may be at least in part implemented on hub 104 and/or server 106 of FIG. 1A. In some embodiments, the process of FIG. 4 is included in 206 of FIG. 2. In some embodiments, the process of FIG. 4 is performed periodically. In some embodiments, the process of FIG. 4 is performed dynamically. For example, the process of FIG. 4 is performed when a new current state is identified.

At 402, identified states are correlated with corresponding controllable device properties. For example, a state that has been identified as being the actual state of a subject in 312 of FIG. 3 is correlated with a corresponding status, a configuration, a functional state, a property, a parameter, and/or any other data of a controllable device of devices 102 of FIG. 1A. In some embodiments, the identified states are correlated with corresponding controllable device properties by analyzing a stored history of identified states and controllable device properties to identify controllable device properties that correspond with identified states. For example, corresponding pairings between an identified state (e.g., state vector) and a corresponding controllable property (e.g., status, configurations, functional states, parameters, and/or any other data) of a controllable device are determined. In some embodiments, correlating the identified states with corresponding controllable device properties includes performing machine learning to discover correlations. For example, statistical and/or deep learning techniques are utilized to discover temporal correlations between identified states and controllable device properties. In some embodiments, the identified states include state vectors that may include one or more of the following: a time value, a weather forecast, a date value, and other data associated with time and/or environment conditions. In some embodiments, a historical probability that an identified state corresponds to a specific controllable device property is determined.

At 404, identified states are correlated with clusters of one or more identified states. In some embodiments, similar identified states (e.g., state value within a range) are clustered together and correlated with a controllable device state. For example, identified device states that are associated with physical locations that are close in range with one another are clustered together. This cluster of states is correlated together with one or more corresponding controllable device properties. In some embodiments, a cluster probability that a cluster of one or more identified states corresponds to the same controllable device property is determined. The cluster probability may identify a historical probability that any identified state included in the cluster corresponds to the controllable device property. In some embodiments, the cluster probability is determined by at least multiplying together individual probabilities of each identified state (e.g., probability determined in 320 of FIG. 3) of the cluster. In some embodiments, the clusters are identified using a graph model (e.g., graph model shown in FIGS. 9A-9D) of the environment. For example, nodes/edges that correspond to the identified states are identified and the cluster is identified based on the proximity within the graph model.

At 406, in the event a historical probability meets a threshold, an associated automation rule is created. For example, if a historical probability determined in 402 and/or a cluster probability determined in 404 is greater than a threshold value (e.g., 80%), a corresponding automation rule is stored in a rule database. In some embodiments, the automation rule identifies that if an identified state (e.g., included in the cluster of identified states) is detected, the corresponding controllable property setting is to be recreated/implemented (e.g., property of corresponding controllable device(s) modified to be the rule specified in controllable device property setting). In some embodiments, the automation rule is updated periodically. For example, the automation rule is associated with an expiration time and the rule is to be renewed or deleted upon expiration. In some embodiments, creating the associated automation rule includes setting or modifying one or more optimization evaluation values identifying a relationship between an identified state and a corresponding controllable device property. For example, a measure of user desirability of the corresponding particular controllable device property setting given the identified state is determined and saved for use when utilizing an optimization function to automatically determine and control the controllable device.

Figure 5:
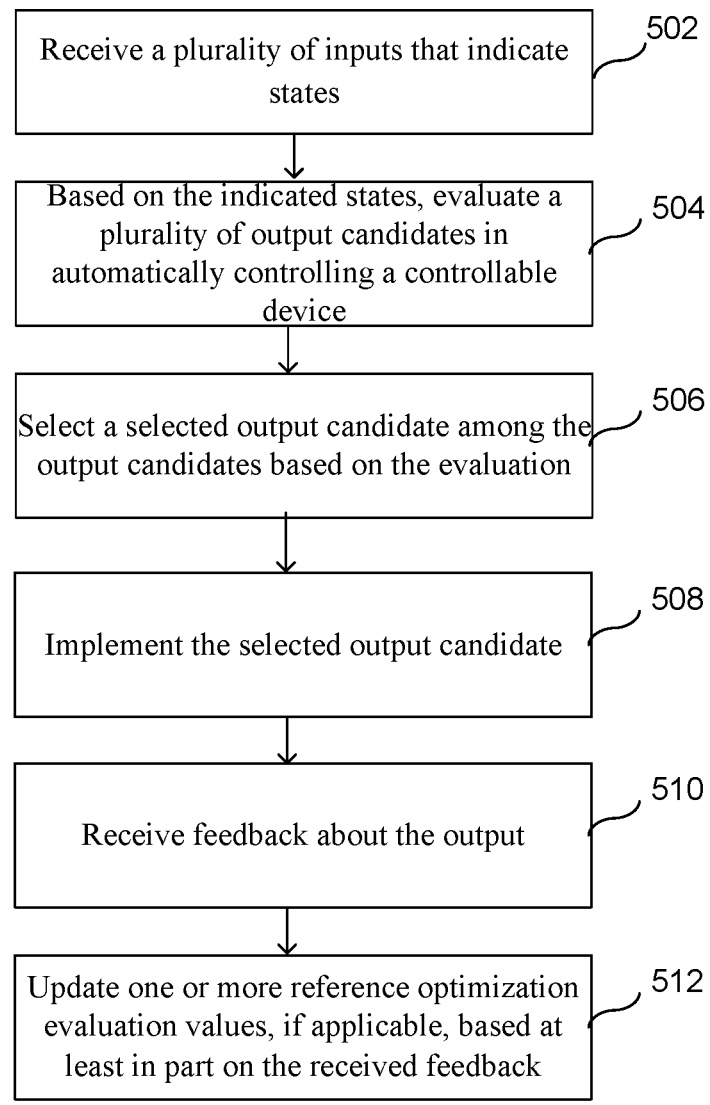
FIG. 5 is a flowchart illustrating an embodiment of a process for determining a selected output result.

FIG. 5 is a flowchart illustrating an embodiment of a process for determining a selected output result. The process of FIG. 5 may be at least in part implemented on hub 104 and/or server 106 of FIG. 1A. In some embodiments, the process of FIG. 5 is included in 208 of FIG. 2. In some embodiments, the process of FIG. 5 is performed periodically. For example, the process of FIG. 5 is repeated at a regular interval of time. In some embodiments, the process of FIG. 5 is performed dynamically. For example, the process of FIG. 5 is performed when a new input or state is identified. In some embodiments, the process of FIG. 5 is repeated for each controllable property of each controllable device to be automatically controlled.

At 502, a plurality of inputs that indicate states is received. For example, each input identifies an associated state of the input. In some embodiments, the received inputs correspond to automatically controlling a controllable device. For example, the states of the inputs are to be analyzed to determine a new control setting and an action is to be potentially performed to implement the new control setting on the controllable device. In some embodiments, the received inputs include one or more states identified in 204 of FIG. 2. In some embodiments, the received inputs include one or more states (e.g., vector of states) identified using the process of FIG. 3. Each received input may indicate corresponding states of one or more subjects (e.g., user location, user activity, user preference, user type, user profile, user category, user proficiently level, user knowledge level, user knowledge of system feature, etc.), devices (e.g., sensor data, controllable device setting, device configuration, etc.), and/or environments (e.g., time, date, weather, humidity, air quality, geographical location, etc.). In some embodiments, the received states include previous states (e.g., history of previous states of subjects, devices, sensors, etc.). In some embodiments, the received states includes a state identifying a previous user provided indication received in response to an inquiry or indication of a user interactive qualification. In some embodiments, one or more of the inputs that indicate the states were determined by analyzing received sensor information. For example, sensor information from one or more devices of devices 102 of FIG. 1A and/or sensors 124 of FIG. 1B is received and utilized to determine the states. In some embodiments, at least one of the plurality of inputs indicates a scene mode. For example, various scene modes (e.g., breakfast scene, sleeping scene, reading scene, movie scene, away mode, etc.) define a desired group of controllable device settings for a particular activity or status of one or more users. The scene mode may be manually specified by a user and/or automatically determined.

In some embodiments, at least one of the plurality of inputs indicates a history of: states, outputs, output types, settings, and/or configurations. For example, the input identifies one or more previously determined outputs identifying controllable device property settings. In some embodiments, one or more of the inputs states are associated with a measure of confidence that the corresponding state is the correct state. For example, it may be difficult to determine the exact correct state based on received sensor information and candidate states are identified along with associated confidence score values.

In some embodiments, receiving the inputs includes selecting inputs to be utilized among a larger group of possible inputs. For example, it is determined which inputs are relevant in automatically determining an output control setting for a property of a controllable device. The selection of inputs to be utilized may have been preconfigured (e.g., determined based on a predefined configuration for a particular controllable property of a controllable device). For example, a programmer has manually configured which inputs are to be analyzed when automatically determining a particular output (e.g., control setting of a controllable device). In some embodiments, the selection of inputs to be utilized is based at least in part on an automation rule that was created in 406 of FIG. 4. In some embodiments, the selection of inputs to be utilized is based at least in part on locations of devices associated with the inputs relative to a controllable device. For example, based on a mapping of physical locations of devices/sensors within an installation environment (e.g., determined using a graph model), states of a device that are located in the same room and/or physically near the controllable device to be controlled are automatically selected as inputs. In various embodiments, the selection of inputs to be utilized is automatically determined based on machine learning.

At 504, based on the indicated states, a plurality of output candidates automatically controlling a controllable device is evaluated. For example, the indicated states are utilized as inputs to one or more evaluation rules discovered in 206 and invoked in 208 of FIG. 2 to automatically control the controllable device by at least in part identifying the output candidates and/or the desirability of the output candidates.

In some embodiments, a plurality of output candidates is evaluated. For example, a plurality of candidates for a controllable property setting of a controllable device (e.g., candidate settings of a property of the controllable device) is evaluated. Each output candidate is not only associated with a particular controllable property setting, it is associated with a particular output handling type. Example output handling types associated with performing an action to modify a controllable property of a controllable device include: performing the action (e.g., action performed without being subject to user interactive qualification), providing a warning that the action will be performed then performing the action (e.g., with a user interactive opportunity to cancel performing of the action), inquiring a user whether to perform the action (e.g., only performing the action if the user interactively confirms performing the action), determining that the user will likely manually perform the action (e.g., not performing action and waiting), and not performing the action.

In some embodiments, the evaluation of the plurality of output candidates is based at least in part on automatically detected/learned and/or user/programmer specified preferences/rules. For example, which optimization function to utilize and/or values (e.g., optimization evaluation/expected values) that indicate preference/relationships between different configuration setting are automatically selected/determined using machine learning and/or preferences/rules (e.g., determined using the process of FIG. 4).

In some embodiments, the plurality of output candidates is evaluated according to an optimization function. For example, a plurality of candidates for a controllable property setting of a controllable device (e.g., candidate settings of a property of the controllable device) is evaluated according to the optimization function. The optimization function depends on the received inputs and one or more parameters of the one or more received inputs. Examples of the optimization function include a cost function, a maximization function, a risk function, a value function, a probability function, a decision function, or any other function that can be utilized to compare the plurality of output candidates. In some embodiments, evaluating the output candidates includes determining a measure of expected desirability of each output candidate (e.g., optimization expected value) for each configuration candidate. For example, for each output candidate, a candidate optimization expected value identifying a desirability of the candidate output is determined. By comparing the optimization expected values using the optimization function, one of the output candidates may be selected as the optimum output to be implemented.

In some embodiments, evaluating the output candidates includes evaluating, for each output candidate (e.g., each output candidate is associated with a particular output handling type and particular configuration setting candidate for a particular controllable property of the controllable device), a measure of expected desirability of the output candidate for each of at least a portion of the received input state. For example, the measure of desirability varies for each different output candidate even though the input state is the same. In some embodiments, in order to determine the measure of desirability for a particular output candidate, an input state component evaluation value (e.g., component expected value) corresponding to the output candidate is determined for each input state and the input state component evaluation values for the output candidate are summed/combined (e.g., averaged) to determine the overall measure of desirability for the output candidate (e.g., total expected value). In other words, component values corresponding to each input state are summed/combined (e.g., weighted averaged) for each output candidate to determine the expected value for each output candidate. In one example, a configuration setting candidate for a motorized curtain device is a curtain open setting and a curtain closed setting. The output handling types of this example include automatically performing an action to place the device in the desired setting (e.g., open or closed curtain), warning a user prior to automatically performing the action, inquiring a user whether to perform the action, and waiting for a user to manually perform the action. In this example, eight total expected values are determined (e.g., four output handling types multiplied by two configuration setting candidates=eight output candidates). For each of these total expected values, component expected values for each input state with respect to the output candidate were determined (e.g., using discovered automation rules) and combined (e.g., using an optimization function) to determine the total expected value.

In some embodiments, rather than evaluating every output handling type for every configuration setting candidate, a desired configuration setting candidate is first chosen among all configuration setting candidates, and then output handling types for the desired configuration setting candidate are evaluated for the desired configuration setting candidate and not for not selected configuration setting candidates. For example, a total overall measure of desirability for each configuration setting candidate is determined (e.g., using automatically discovered automation rules) by combining individual component measures of desirability for each configuration setting candidate corresponding to each input state for the corresponding configuration setting candidate. By comparing the total overall measure of desirability for the different configuration setting candidates (e.g., using an optimization function), the desired configuration setting candidate is chosen. Then, given the desired configuration setting candidate, different output handling types are evaluated by determining total expected values for each of the different output handling types for the desired configuration setting candidate. For each of these total expected values, component expected values for each input state with respect to the corresponding output handling type are determined (e.g., using discovered automation rules) and combined (e.g., using an optimization function) to determine the total expected value for the corresponding output handling type. This effectively narrows the output candidates to the different output handling types of the selected desired configuration setting candidate.

In some embodiments, the measures of desirability (e.g., expected values) may take into consideration potential benefit/risk/cost of choosing an associated output candidate given the input states, potential harm of not choosing the associated output candidate given the input states, a history of past output candidates selected, annoyance to a user for choosing the associated option, etc. among other factors.

In one example, when determining the expected value of an output candidate associated with output handling of interactively inquiring to a user, whether to perform an action to implement the associated configuration setting, the expected value of this output candidate takes into consideration the annoyance of the inquiry to a user in light of a detected state of the user (e.g., high annoyance to user if user is in sleeping state). In another example, when determining the expected value of an output candidate associated with output handling of waiting for a user to manually perform the action, the expected value associated with this output candidate takes into consideration the amount of effort required by the user to manually perform the action (e.g., low effort if user is physically near a physical switch and user typically manually operates the switch).

In another example, when determining the expected value of an output candidate associated with output handling of informing a user with a warning prior to performing the action to provide the user an opportunity to interactively prevent triggering of the action, the associated expected value of this output candidate takes into consideration severity of the action (e.g., highly consequential actions such as opening bedroom curtains at night should not be automatically performed unless input states can be determined with high confidence) and previously selected outputs (e.g., if a user has not responded to previous requests to provide a response on whether to perform the action, it is more likely that the action is performed after a warning).

In another example, when determining the expected value of an output candidate associated with performing the action without being subject to a user interactive qualification, the associated expected value of this output candidate takes into consideration whether a user has previously indicated a desire to perform actions. For example, a user may indicate a desire to perform any action to increase comfort/satisfaction of the user (e.g., user provides a voice command to "make me happy"), and it is more likely that the action will be performed without qualification (e.g., without warning or user confirmation requirement) given the user's awareness and desire for the system to perform actions to increase user satisfaction. In some embodiments, the user indication of the desire to perform any action to increase comfort/satisfaction of the user is associated with a detected user command that is ambiguous or not understood by the system. For example, even if a user command is not fully understood, it indicates a desire by the user to perform one or more actions to increase comfort and satisfaction of the user.

In some embodiments, one or more component evaluation values (e.g., component expected values) are dynamically determined. For example, rather than using a predetermined static mapping from the output candidate and input state to a component evaluation value, the component evaluation value may vary according to one or more other variables. In one example, a component evaluation value decays over time from a time of a specified event according to a decay function parameterized by a parameter that utilizes a time value as an input. When taking into account a history of previous states in the input states, the decay of the component evaluation value may be utilized to emphasize effects of recent historical states while deemphasizing older historical states. In some embodiments, one or more component evaluation values are based on an amount of time passed from a previous output event. For example, there exists a limit on a total number of user interactive inquiries provided to a user within a specified recent time window and one or more component evaluation values become larger or smaller depending on whether this limit has been reached.

In some embodiments, rather than only evaluating each individual input state separately for a particular output candidate, a cluster of input states is evaluated together as a group for a particular output candidate. For example, certain input states are determined to be correlated together (e.g., based on the graph model) and for an output candidate, a component optimization evaluation value is determined for the cluster of input states (e.g., based on the graph model) as a single entity rather than separately for individual input states.

At 506, a selected output candidate is selected among the output candidates based on the evaluation. For example, an output that optimizes the optimization function is selected among the output candidates. In some embodiments, the selected output candidate specifies a selected configuration setting of a property of the controllable device. In some embodiments, selecting the output includes selecting an output candidate based on a comparison of the output candidate optimization evaluation values (e.g., compare optimization evaluation values using the optimization function). For example, a cost value (e.g., expectation value) has been determined for each output candidate and a cost minimization function is utilized to select the output candidate with the minimal cost value.

In various embodiments, by utilizing the optimization function, conflicts between automation correlations/policies/rules are resolved. For example, two or more automation correlations/policies/rules are to be activated because the received input state triggers these automation correlations/policies/rules, but they may specify conflicting controllable device settings that cannot be all implemented at the same time (e.g., one rule specifies an "on" configuration setting while another rule specifies an "off" configuration setting). By comparing various associated optimization values associated with each possible configuration setting, the most optimal configuration setting given the input states may be determined.

At 508, the selected output candidate is implemented. In some embodiments, an action associated with the selected output candidate is performed, if applicable. For example, if a controllable device configuration setting of the selected output candidate is a change from a current setting, the action is performed by providing an instruction to the controllable device to change to the controllable device configuration setting of the selected output candidate, if applicable, based on the output handling type of the selected output candidate. Another example of the action includes sending an alert/notification to a remote user based on information captured using one or more sensor devices.

In some embodiments, the action associated with the selected output candidate is to be performed at a time in the future (e.g., action to turn on coffee maker 9 am tomorrow). For example, performing the action includes scheduling one or more instructions provided or to be provided to the controllable device to change a setting of the controllable device at a specified time in the future. In some embodiments, the action associated with the selected output candidate is to be repeated (e.g., repeated at a specified interval). For example, performing the action includes scheduling one or more instructions provided or to be provided to the controllable device to change a setting of the controllable device periodically (e.g., open curtains every weekday morning at 9 am). In some embodiments, a controllable device configuration setting of the selected output candidate indicates a configuration setting that affects a future state or behavior of a controllable device. For example, the controllable device configuration setting of the selected output candidate indicates a desired brightness intensity whenever a lightbulb is switched on in the future. In some embodiments, the action and/or the selected output candidate are associated with controlling a plurality of configuration settings for a plurality of controllable devices. For example, the action triggers instructions to be sent to a plurality of different controllable device to change to their controllable device configuration settings.

Figure 7:
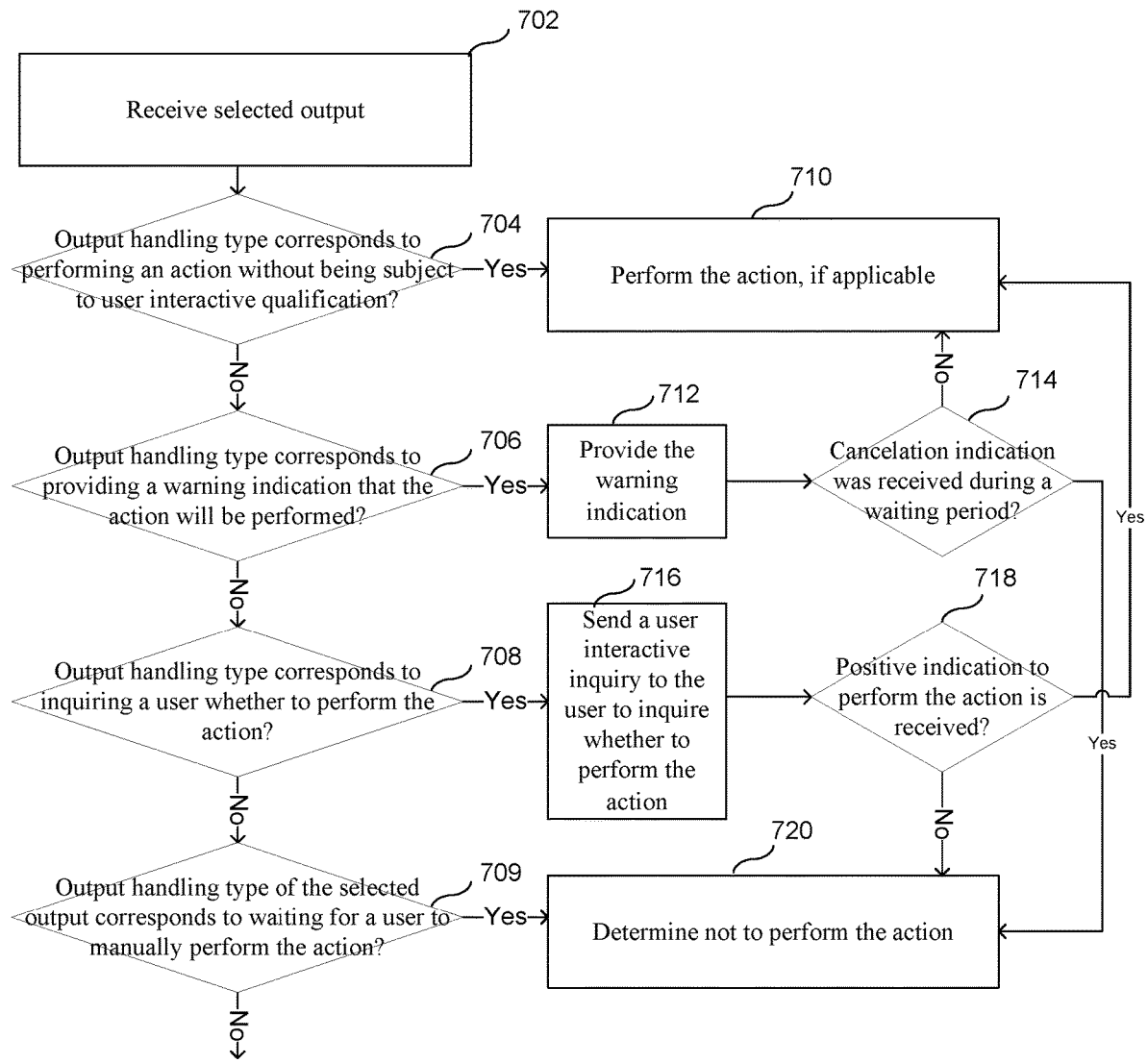
FIG. 7 is a flowchart illustrating an embodiment of a process for implementing a selected output.

Example output handling types associated with performing an action include: performing the action (e.g., action performed without being subject to user interactive qualification), providing a warning that the action will be performed then performing the action (e.g., with a user interactive opportunity to cancel performing of the action), inquiring a user whether to perform the action (e.g., only performing the action if the user interactively confirms performing the action), determining that the user will likely manually perform the action (e.g., not performing action and waiting), and not performing the action. Depending on the output handling type associated with the selected output candidate, implementation of the selected output candidate is handled differently. An example of the different types of processes is shown in FIG. 7.

At 510, feedback about the output is received. For example, in the event the output result resulted in an undesirable output result (e.g., configuration setting of the controllable device), a user may specifically override the configuration setting by explicitly changing the configuration setting (e.g., adjust control switch of the network connected controllable device). In some embodiments, a user may confirm via a user indication whether a change in output configuration settings was desired. For example, using a user device, a user may specify whether a recent output resulted in an automation behavior desired by the user. In some embodiments, a lack of an action by a user is a confirmation feedback that the output was not undesirable. For example, a relationship between an input state and the selected output is assumed to be more acceptable by a user the longer and/or more often the user has not provided feedback or modified the configuration setting given the same input state.

At 512, one or more reference optimization evaluation values are updated, if applicable, based at least in part on the received feedback. For example, one or more reference values (e.g., evaluation metric values to be referenced for future evaluations in determining an expected value) identifying an association between an input state and a particular output candidate (e.g., configuration setting of the controllable device) are updated using the received feedback. For example, a positive indication from a user that the output was desired reduces an associated optimization evaluation value and a negative indication from the user that the output was not desired increases the associated optimization evaluation value.

Figure 6:
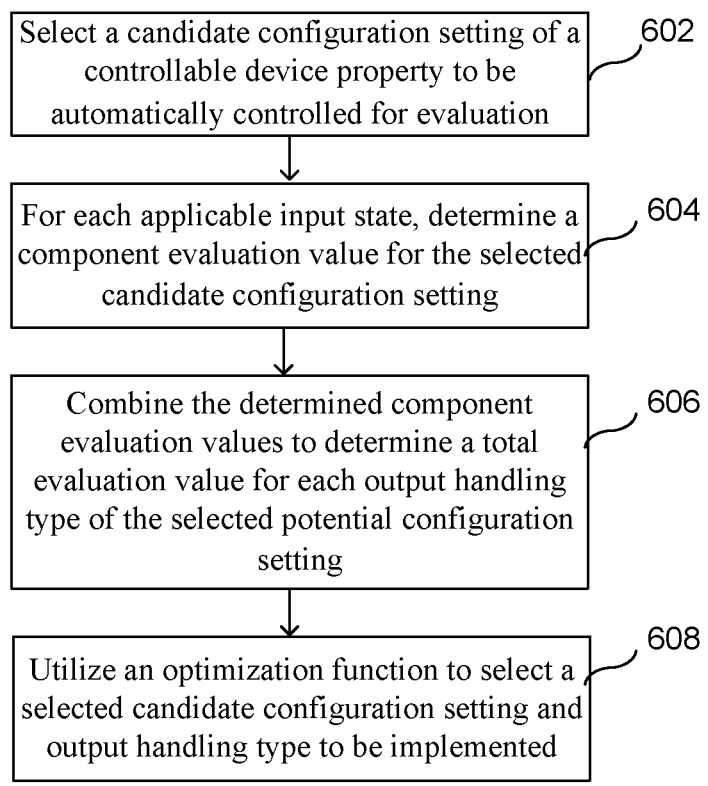
FIG. 6 is a flowchart illustrating an embodiment of a process for automatically determining an output candidate of a controllable property of a network connected controllable device.

FIG. 6 is a flowchart illustrating an embodiment of a process for automatically determining an output candidate of a controllable property of a network connected controllable device. The process of FIG. 6 may be at least in part implemented on hub 104 and/or server 106 of FIG. 1A. In some embodiments, at least a portion of the process of FIG. 6 is included in 208 of FIG. 2. In some embodiments, at least a portion of the process of FIG. 6 is included in 504 and/or 506 of FIG. 5.

At 602, a candidate configuration setting of a controllable device property to be automatically controlled is selected for evaluation. For example, in order to automatically determine the configuration setting of the property of the controllable device, each candidate configuration setting for the property is to be evaluated based on states (e.g., states of users, sensors, devices, environment, configuration modes/groupings, etc. received in 502) of a network connected device installation environment (e.g., apartment unit) and each candidate configuration setting is selected iteratively for evaluation. In some embodiments, selecting the next candidate configuration setting includes selecting a next item in a list of candidate configuration settings for a property of the controllable networked device. In some embodiments, the list of candidate configuration settings includes all possible configuration settings of the property of the controllable networked device. Examples of the property of the controllable networked device include a switch state, a value setting, an intensity level, whether a notification should be sent, and any other controllable property. In various embodiments, the controllable network device is included in devices 102 of FIG. 1A or devices 126 of FIG. 1B.

The list of candidate configuration settings for the property may be preconfigured. For example, a subset from all possible configuration settings for the property has been selected to be included in the list. In some embodiments, the list of candidate configuration settings for the property to be iterated is dynamically determined. For example, candidate configuration setting values are bounded by one or more limits that dynamically vary based on one or more variables. For example, the maximum intensity output of a light bulb is limited based on a time of day (e.g., bulb is allowed to output the entire range of intensities during daylight hours but is bounded to only output 50% of maximum intensity during night hours) and the list of candidate configuration settings only includes intensity values within the time-based limit.

At 604, for each applicable input state, a component evaluation value for the selected candidate configuration setting is determined. For example, for each applicable input state of input states received in 502 of FIG. 5 to automatically control the property of the controllable networked device, the component evaluation value for the selected candidate configuration setting is determined.

In some embodiments, there exists a data structure that stores for each different pair of input state and candidate output (e.g., for a particular configuration setting), a corresponding component evaluation value that quantifies the relationship between the input state and the candidate output. For example, the component evaluation value identifies the magnitude of the desirability of the selected candidate configuration setting for a particular input state. In some embodiments, the component evaluation value is based at least in part on automatically detected/learned and/or user/programmer specified preferences/rules. For example, which optimization function to utilize and/or component optimization evaluation/expected values that indicate preference/relationships between a particular configuration setting are automatically selected/determined using machine learning and/or preferences/rules (e.g., determined using the process of FIG. 4).

In some embodiments, the component evaluation value is determined based on the graph model. For example, properties of relevant edges between relevant nodes identify desirability of the selected candidate configuration setting. In one example, the component evaluation value is a cost value to be evaluated using a cost function. In some embodiments, the component evaluation value is at least in part calculated using a formula. In some embodiments, the evaluation value has been automatically determined. For example, the evaluation value has been determined using machine learning based on detected data and user feedback. In some embodiments, the evaluation value has been at least in part predefined. For example, a user and/or programmer has specified the evaluation value.

In some embodiments, determining the component evaluation value for an input state includes utilizing one or more parameters to dynamically determine the component evaluation value. For example, rather than using a predetermined static value, the component evaluation value may vary according to one or more other variables that are inputs to the parameters. In some embodiments, a component evaluation value decays over time from a time of a specified event according to a decay function parameterized by a parameter that utilizes a time value as an input. For example, a light intensity of a light bulb is to decay gradually after a light switch has been manually turned on and the component evaluation value associated with a full brightness light intensity setting decays according to a parameter decay function that utilizes as its input a time since a switch was turned on. In some embodiments, a component evaluation value varies according to a parameter based on a number of users detected in an environment (e.g., evaluation value for a particular switch state and a candidate light level configuration setting is based on the number of users in a room).

In some embodiments, the one or more input states and/or parameters are based on one or more previous outputs or configuration settings. For example, it is not desirable to rapidly change configuration settings within a short period of time (e.g., might damage a motor, light bulb, etc.) and multiple changes to different configuration settings in a short period of time are discouraged by taking into consideration previous configuration setting changes when determining the component evaluation value (e.g., add an adjustment factor to a base component evaluation value when many configuration changes have been implemented for the same property of the controllable device within a short period of time).

In some embodiments, rather than only evaluating each applicable input state separately for a particular component evaluation value, a cluster of input states is evaluated together as a group for a particular component evaluation. For example, certain input states are determined to be correlated together (e.g., based on the graph model) and a component optimization evaluation value is determined for the cluster of input states as a single entity rather than separately for individual input states.

At 606, the determined component evaluation values are combined to determine a total evaluation value (e.g., total expected value) for each output handling type of the selected potential configuration setting. The output handling type of the selected candidate configuration setting specifies how and whether an action to change a device setting to the associated selected candidate configuration setting is handled, if applicable (e.g., how controllable device property setting change is handled). Example output handling types associated with performing an action to modify a property of a controllable device include: performing the action (e.g., action performed without being subject to user interactive qualification), providing a warning that the action will be performed then performing the action (e.g., with a user interactive opportunity to cancel performing of the action), inquiring a user whether to perform the action (e.g., only performing the action if the user interactively confirms performing the action), determining that the user will likely manually perform the action (e.g., not performing action and waiting), and not performing the action.

In some embodiments, the determined component evaluation values for the selected candidate configuration setting are summed/combined together. In some embodiments, determining the total evaluation values includes determining a weighted sum of one or more of the determined component optimization evaluation values. In some embodiments, determining the total evaluation value includes determining an average of one or more of the determined component evaluation values.

In some embodiments, determining the total evaluation value includes determining a weighted value of component evaluation values. For example, because the exact correct current state may be difficult to determine with complete accuracy, one or more of the received input states are associated with one or more weight factors (e.g., percentage value) representing a determined likelihood that the input state is the actual correct input state. This may allow different candidate input states for the same actual input state to be received and evaluated independently then weighted and combined together (e.g., weighted average) based on the weight factors. For example, a received input indicates that there is a 70% likelihood that a user is in a sitting state and a 30% likelihood that the user is in a standing state. Prior to being summed with other optimization evaluation values, the determined component evaluation value for the sitting state is multiplied by 0.7 and the determined component value for the standing state is multiplied by 0.3. The weight value may dynamically change based on one or more factors (e.g., based on time or other environmental variable/state).

In some embodiments, the summed or averaged result of the component evaluation values or weighted component evaluation values are scaled and/or adjusted (e.g., adjustment value added or subtracted) to determine a total evaluation value for each output handling type of the selected potential configuration setting. For example, a scaling or adjustment value is specific to each different output handling type of a particular configuration setting and varies based on one or more of the input states. For example, for each of one or more input states, a corresponding scaling or adjustment value specific to the particular configuration setting and output handling type is determined and applied (e.g., applied to component evaluation values and/or total evaluation values) to determine the final total evaluation value (e.g., total expected value) for each output handling type of the selected potential configuration setting.

In some embodiments, the scaling and/or adjustment values may take into consideration potential benefit/risk/cost of choosing an associated output handling type for the selected potential configuration setting, potential harm of not choosing the associated output handling type for the selected potential configuration setting, a history of past output handling types selected, annoyance to a user for choosing the associated output handling type, etc. among other factors.

In one example, when determining the scaling and/or adjustment value associated with an output handling type of interactively inquiring a user whether to perform an action to implement the associated configuration setting, the scaling and/or adjustment value of this output handling type takes into consideration the annoyance of the inquiry to a user in light of a detected state of the user (e.g., high annoyance to user if user is in sleeping state). In another example, when determining the scaling and/or adjustment value associated with an output handling type corresponding to waiting for a user to manually perform the action, the scaling and/or adjustment value associated with this output handling type takes into consideration the amount of effort required by the user to manually perform the action (e.g., low effort if user is physically near a physical switch and user typically manually operates the switch).

In another example, when determining the scaling and/or adjustment value associated with an output handling type associated corresponding to informing a user with a warning prior to performing the action, the associated scaling and/or adjustment value of this output candidate takes into consideration severity of the action (e.g., highly consequential actions such as opening bedroom curtains at night should not be automatically performed unless input states can be determined with high confidence) and previously selected outputs (e.g., if a user has not responded to previous requests to provide a response on whether to perform the action, it is more likely that the action is performed after a warning).

In another example, when determining the scaling and/or adjustment value of an output handling type associated with performing the action without being subject to a user interactive qualification, the associated scaling and/or adjustment value of this output handling type takes into consideration whether a user has previously indicated a desire to perform actions. For example, a user may indicate a desire to perform any action to increase comfort/satisfaction of the user (e.g., user provides a voice command to "make me happy"), and it is more likely that the action will be performed without qualification (e.g., without warning or user confirmation requirement) given the user's awareness and desire for the system to perform actions to increase user satisfaction.

In some embodiments, it is determined whether there exists an additional candidate configuration setting of the property of the controllable networked device to be selected for evaluation. For example, it is determined whether there exists a next candidate configuration setting to be evaluated from a list of candidate configuration settings to be evaluated. If it is determined that there exists an additional candidate configuration setting to be selected for evaluation, the process returns to 602.

At 608, an optimization function is utilized to select a selected candidate configuration setting and output handling type to be implemented.

In some embodiments, the optimization function to be utilized is predetermined. In some embodiments, the optimization function to be utilized is selected among a plurality of optimization functions based on one or more factors (e.g., property to be controlled, input states, user preference, etc.). In some embodiments, utilizing the optimization function includes comparing the total evaluation values (e.g., expected values) for each of the candidate configuration settings and output handling types using the optimization function to select the most optimal total evaluation value. For example, the optimization function is a cost optimization function and each of the determined total evaluation values represents cost values, and the selected candidate configuration setting is the candidate configuration setting with the lowest cost value. Other examples of the optimization function include a maximization function, a risk function, a value function, a probability function, and a decision function, among others. In some embodiments, the optimization function specifies that the candidate configuration setting and output handling type with the largest output candidate optimization evaluation value is to be selected. In some embodiments, the optimization function specifies that the candidate configuration setting and output handling type with a local minimum/maximum output candidate optimization evaluation value is to be selected. In various embodiments, utilizing the optimization function includes identifying a statistically relevant value among the determined total evaluation values using a criteria defined by the optimization function and identifying the corresponding selected candidate configuration setting and output handling type as the setting to be implemented on the controllable device in a manner of the output handling type.

In some embodiments, the selected potential configuration setting and output handling type are provided for implementation in 508 of FIG. 5 and the process returns to 510 of FIG. 5. In some embodiments, the selected candidate configuration setting is provided to the controllable device only if the selected candidate configuration setting indicates a different configuration setting than a current configuration setting of the controllable device property being automatically controlled.

In one illustrative example of the process of FIG. 6, in order to determine whether to automatically open the living room curtains that are motorized by a controllable network connected device motor, the candidate configuration settings of a curtain open setting and a curtain close setting are evaluated separately. The received input state indicates that there is a 70% chance that a user is in the living room (e.g., 70% chance of living room state) and a 30% chance that the user is in the bedroom (e.g., 30% chance of bedroom state). When the curtain open setting is evaluated, component evaluation values of −1 for the living room state and −11 for the bedroom state are combined to determine a combined evaluation value of −4 (e.g., (0.7)*(−1)+(0.3)*(−11)). For the living room state, this combined evaluation value of −4 is scaled/adjusted for each of three different output handling types to identify the total evaluation value of −10 for output handling type 1, −5 for output handling type 2, and −1 for output handling type 3. For the bedroom state, the combined evaluation value of −4 is scaled/adjusted for each of the three different output handling types to identify the total evaluation value of −20 for output handling type 1, −20 for output handling type 2, and −20 for output handling type 3. After combining the total evaluation values for the different states, the combined total evaluation values of −13 (e.g., (0.7)(−10)+(0.3)(−20)) for output handling type 1, −9.5 (e.g., (0.7)(−5)+(0.3)(−20)) for output handling type 2, and −6.7 (e.g., (0.7)(−1)+(0.3)(−20)) for output handling type 3 result for the curtain open setting. Applying a similar process to the curtain close setting, combined example total evaluation values of −21 for output handling type 1, −12 for output handling type 2, and −10 for output handling type 3 result for the curtain close setting. A cost optimization function to be utilized specifies that the configuration setting candidate with the lowest total evaluation value is to be selected and the curtain open setting with output handling type 3 (i.e., −6.7 is the lowest value) is selected as the selected output candidate to be implemented because it had the lowest total evaluation value.

FIG. 7 is a flowchart illustrating an embodiment of a process for implementing a selected output. The process of FIG. 7 may be at least in part implemented on hub 104 and/or server 106 of FIG. 1A. In some embodiments, at least a portion of the process of FIG. 7 is included in 508 of FIG. 5.

At 702, a selected output is received. In some embodiments, the selected output is the output candidate selected in 506 of FIG. 5.

At 704, it is determined whether an output handling type of the selected output corresponds to performing an action without being subject to user interactive qualification. For example, it is determined whether the output handling type corresponds to performing the action without providing a user warning or requiring user confirmation to perform the action. If at 704, it is determined that the output handling type of the selected output does correspond to performing the action without user interactive qualification, at 710, the action is performed, if applicable.

For example, at 710, if a controllable device configuration setting of the selected output candidate is a change from a corresponding current setting of a property of a controllable device, the action is performed by providing an instruction to the controllable device to change to the specified device configuration setting of the selected output candidate. In some embodiments, the action is not associated with a persistent property state of the controllable device and the action is always performed in 710. For example, performing the action includes sending an alert/notification to a remote user based on information captured using one or more sensor devices. In some embodiments, performing the action includes performing the action gradually in partial steps over a period of time. For example, if the action is to change a volume intensity of a speaker to a new target intensity level, the volume intensity of the speaker is changed gradually over time towards the new target intensity level. While gradually performing the action, an indication may be received from a user to stop/pause the gradual performance of the action. For example, a user indicates to stop/pause the volume change during a gradual increase of audio volume at a level desired by the user. If the indication is received to stop/pause the gradual performance of the action, the action is stopped/paused and the current setting at the point of the stop indication is maintained. In some embodiments, if the indication is received to reverse the action, the action is action is reserved (e.g., provide an instruction to the controllable device to revert back to a previous device configuration setting).

If at 704, it is determined that the output handling type of the selected output does not correspond to performing the action without being subject to user interactive qualification, at 706, it is determined whether the output handling type of the selected output corresponds to providing a warning indication that the action will be performed. If at 706 it is determined that the output handling type of the selected output does correspond to providing the warning indication that the action will be performed, at 712, the warning indication is provided. For example, the warning indication provides a hint to a user that action will be performed.

The warning indication may include an interactive visual warning (e.g., turn on warning lights, flash lights, change light intensity, change light color, an electronic display warning, etc.), an auditory warning (e.g., voice warning via speakers, audio tone, change audio/volume intensity etc.), a warning message (e.g., email, text message, chat message, application notification, etc.), a vibration warning, a mechanical warning (e.g., activate motor, open or close window shade, etc.) and any other type of warning notification. In some embodiments, the warning notification may gradually increase in intensity (e.g., light intensity, color, volume, message severity, etc.) over time as it gets closer to performing the action. In some embodiments, providing the warning indication includes gradually or partially performing the action. For example, if the action is to change a light intensity of a lightbulb to a new target intensity level, the light intensity of the lightbulb is changed partially towards the new target intensity level. In another example, if the action is to fully open a motorized curtain, the curtain is opened slightly to provide an indication that the curtain will be fully opening. In some embodiments, the warning indication provides a time value indicating when the action will be performed. For example, a message is provided to a user that lights will automatically turn on in three minutes unless otherwise instructed.

At 714, it is determined whether a cancelation indication was received during a waiting period. For example, after the waiting period has passed the process proceeds to 710. During the waiting period, a user is able to provide an indication to cancel or stop performing of the action. The cancelation indication may be provided via voice command, movement gesture (e.g., detected by a camera), a physical switch activation, a computer input, an application input, a digital message, and any other user input. If the cancelation indication was received in 714, it is determined not to perform the action in 720. If the cancelation indication was not received in 714, the process proceeds to 710. In some embodiments, in the event providing the warning indication in 712 included gradually or partially performing the action, the received cancelation indication may indicate to undo the gradually or partially performed action. If the cancelation indication indicates to undo the gradually or partially performed action, at 720, the gradually or partially performed action is reserved (e.g., provide an instruction to the controllable device to revert back to a previous device configuration setting). In some embodiments, although a cancelation indication is not received in 714, an indication is received to stop a performance of the action being performed in gradual steps prior to complete completion of the action. If the indication is received to stop the gradual performance of the action before the end of the waiting period (e.g., the waiting period is the amount of time required to completely complete the gradual performance of the action), the gradual performance of the action is paused and the current controllable device setting at the point of the indication is maintained in 710.

If at 706 it is determined that the output handling type of the selected output does not correspond to providing the warning indication that the action will be performed, at 708, it is determined whether the output handling type of the selected output corresponds to inquiring a user whether to perform the action. If at 708 it is determined that the output handling type of the selected output does correspond to inquiring whether to perform the action, at 716, a user interactive inquiry is sent to the user to inquire whether to perform the action. The inquiry may be sent via a visual inquiry (e.g., turn on lights, flash lights, change light color, inquiry on an electronic display, etc.), an auditory inquiry (e.g., voice question via speakers, audio tone, etc.), an inquiry message (e.g., email, text message, chat message, application notification, etc.), vibration inquiry, and any other type of user inquiry. In some embodiments, the inquiry may gradually increase in intensity (e.g., light intensity, color, volume, message severity, etc.) over time if the user does not provide a response.

After 716, at 718, it is determined whether a positive indication to perform the action is received. The user may provide the positive indication via voice command, movement gesture (e.g., detected by a camera), a physical switch activation, a computer input, an application input, and any other user input. If at 718 the positive indication is received, the process proceeds to 710. If at 718 the positive indication is not received (e.g., negative indication or no indication within a specified time period), the process proceeds to 720.

If at 708 it is determined that the output handling type of the selected output does not correspond to inquiring whether to perform the action, at 709, it is determined whether the output handling type of the selected output corresponds to waiting for a user to manually perform the action. If at 709 it is determined that the output handling type of the selected output does correspond to waiting for a user to manually perform the action, the process proceeds to 720. In some embodiments, if at 709 it is determined that the output handling type of the selected output does correspond to waiting for a user to manually perform the action, the process waits for a specified amount of time to allow the user to manually perform the action, and if the user does not perform the action within the specified amount of time, the process may proceed to 710, 712 or 716 (not shown). Although four types of output handling types have been shown in FIG. 7, additional or other output handling types may exist in various other embodiments. For example, if at 709 it is determined that the output handling type of the selected output does not correspond to waiting for a user to manually perform the action, other tests may be performed to identify other output handling types.

In some embodiments, one or more aspects of a user response received in any of the steps of FIG. 7 is utilized in automatically controlling a controllable device. For example, one or more aspects of the user response (e.g., a tone of the response, a detected user annoyance in the response, voice prosody, content of the response, etc.) is utilized as an input state in 502 of FIG. 5, in selecting the selected output candidate in 506 of FIG. 5, as an input to the optimization function utilized in 608 of FIG. 6, etc.

Figure 8:
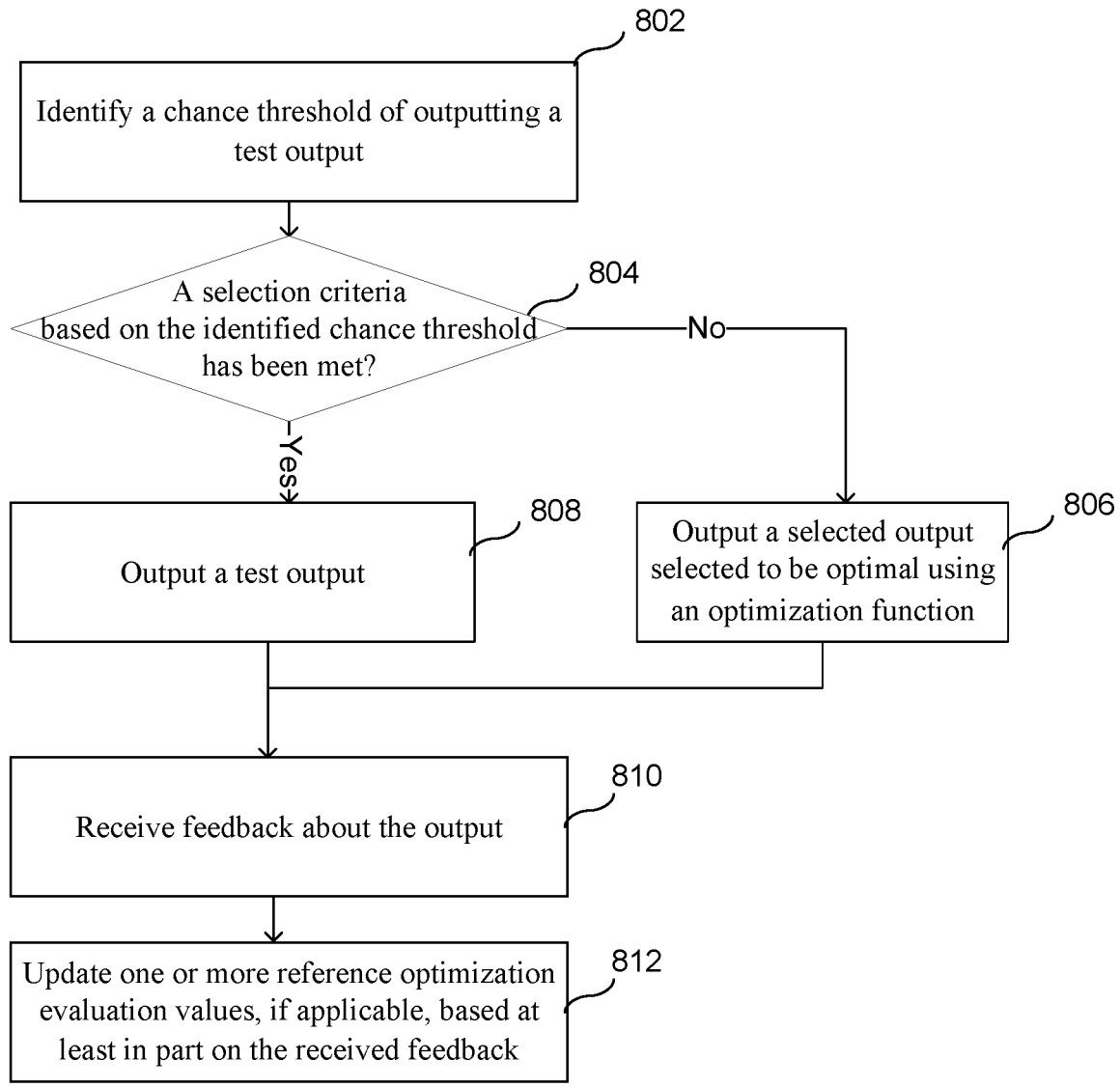
FIG. 8 is a flowchart illustrating an embodiment of a process for attempting to discover an improved output.

FIG. 8 is a flowchart illustrating an embodiment of a process for attempting to discover an improved output. The process of FIG. 8 may be at least in part implemented on hub 104 and/or server 106 of FIG. 1A. In some embodiments, at least a portion of the process of FIG. 8 is included in 208 of FIG. 2. In some embodiments, at least a portion of the process of FIG. 8 is included in 506 of FIG. 5. In some embodiments, at least a portion of the process of FIG. 8 is included in 608 of FIG. 6. In some embodiments, at least a portion of the process of FIG. 8 is repeated each time an output to control a controllable device is to be automatically determined.

At 802, a chance threshold of outputting a test output is identified. For example, when utilizing an optimization function to select the most optimal output (e.g., using the process of FIGS. 5 and/or 6), the selected output is selected based on determined candidate optimization evaluation values of the output candidates. However, if the candidate optimization evaluation values do not accurately capture the desirability of an output candidate, the selected output candidate may be suboptimal. Although the optimization evaluation values mapping to results and inputs may be adjusted and improved based on feedback (e.g., user manually changes the suboptimal setting to the optimal setting and machine learning is utilized to learn from this change), the user may not provide valuable feedback to improve output results if the output is satisfactory despite being not optimal. For example, although the optimal fan speed setting is low speed, a user may not provide feedback to indicate this optimal speed if a current different fan setting (e.g., high speed) is satisfactory.

In some embodiments, in an attempt to discover a more optimal output (e.g., output configuration setting of a controllable device), an output that may not be the most optimal according to an optimization is provided as the output in limited instances to discover potentially more optimal outputs. For example, rather than using the most optimal output selected by an optimization function, a random output and/or second most optimal output is provided as the output to discover whether this output is potentially a more optimal output. In some embodiments, the chance threshold identifies the target probability that an output that was not selected as the most optimal output is to be provided as the output. In some embodiments, the chance threshold is dynamically determined. For example, by dynamically varying the chance threshold, a beta tester could be exposed to more test outputs that may not be most optimal while a commercial user that desires reliability is exposed to relatively less test outputs that may not be most optimal. In another example, rather than continually exposing a user to successive test outputs that may not be most optimal, the number of test outputs provided within a time interval is limited by varying the learning selection chance threshold.

In some embodiments, identifying the chance threshold includes dynamically selecting the chance threshold value based at least in part on one or more of the following: one or more input states (e.g., received in 502 of FIG. 5), a time since a last test output, a profile of a user, a correctness result/feedback of the last test output, a current time/date, and a type of property and/or controllable device to be controlled, etc.

At 804, it is determined whether a selection criteria based on the identified chance threshold has been met. For example, it is determined whether a test output that is not an optimization function selected output should be outputted based on a randomized selection criteria evaluated using the chance threshold. In some embodiments, in order to determine whether a test output is to be provided, a random value is selected and it is determined whether the random value is within a range bounded by a limit of the chance threshold. (e.g., if the random value is less than the chance threshold value, the chance threshold is met or otherwise it is not met).

If at 804 it is determined that the selection criteria has not been met, at 806 a selected output selected to be optimal using an optimization function is outputted. For example, an output selected by an optimization function to be optimal (e.g., in 506 of FIG. 5, 608 of FIG. 6, etc.) is provided as an output to control a controllable device.

If at 804 it is determined that the selection criteria has been met, at 808 a test output is outputted. For example, among potential output candidates (e.g., candidate configuration setting of a property of a controllable device to be controlled) that have been identified (e.g., identified in 602 of FIG. 6), one of the output candidates is randomly selected and outputted. The output candidates that are eligible to be randomly selected to be outputted may be limited based on an analysis performed using an optimization function. For example, only the top 50% of output candidates as ranked by the optimization function are eligible to be selected for output as the test output. In another example, a second most optimal output as determined based on the optimization function is provided as the test output.

At 810, feedback about the output is received. For example, in the event the output resulted in an undesirable configuration setting of the property of the controllable device, a user may specifically override the configuration setting by explicitly changing the configuration setting (e.g., adjust control switch of the device). In some embodiments, a user may confirm via a user indication whether the output configuration setting is a desired configuration setting. For example, using a user device, a user may specify whether a recent output resulted in an automation behavior desired by the user (e.g., optimization component value(s) modified based on indication). In some embodiments, a lack of an action by a user is a confirmation feedback that the output was not undesirable. For example, a relationship between an input state and the output is assumed to be more acceptable by a user the longer and/or more often the user has not provided feedback or modified the configuration setting given the same input state.

At 812, one or more reference optimization evaluation values are updated, if applicable, based at least in part on the received feedback. For example, one or more reference values (e.g., values to be referenced for future evaluations) identifying an association between an input state and a particular output (e.g., configuration setting of the controllable device) are updated using the received feedback. For example, a positive indication from a user that the output was desired reduces an associated optimization evaluation value and a negative indication from the user that the output was not desired increases the associated optimization evaluation value.

FIGS. 9A-9D are diagrams illustrating various example levels of a hierarchical deployment environment graph model. For example, the graph model is stored in hub 104 and/or server 106 of FIG. 1A for use in rule discovery and implementation as well as device control. In some embodiments, the graph model of a deployment environment is a model of devices/sensors and the physical environment and their connections in graph data format. The devices/sensors and the physical environment locations are represented as nodes in the graph model and connections between the nodes are represented as edges. A device node in the graph model does not necessarily have to be a "smart" or network "connected" or an "IoT" device. For example, a normal "dumb" light bulb is represented as a node in the graph model because it affects lighting of a room/environment represented in the graph model. Other nodes in the graph model may be able to sense and/or control this light bulb. For example, the light bulb node may be connected to another device node in the model that can sense the state of the bulb (e.g., light sensor node) and/or has control over the light bulb (e.g., smart network connected light switch). The graph model of the examples is hierarchical and a node at one level may represent one or more nodes and edges in a lower level that inherit properties of the higher level node. Edges may exist across levels and between nodes of different hierarchical levels/groupings. Each node may be associated with one or more properties that each identify a description, a configuration, a setting, an identification, and/or any other property about the node. Each edge may be associated with one or more properties that identify a relationship between the nodes connected by the edge. For example, relationships that identify a physical location/property (e.g., physical connection type edge), a functional property (e.g., functional connection type edge), a behavioral property (e.g., behavioral activity connection type edge), and/or any other relationship property are identified as a property of an edge. The graph model levels shown in FIGS. 9A to 9D are merely examples and have been simplified to illustrate the examples clearly. Not all nodes and edges have been shown and additional nodes and edges may exist. Node properties may include physical properties such as lighting, temperature, humidity, geographic locations (e.g., the rooms/areas in the home), dimensions, vibrations, pressure, locations, sunlight direction, locations of the devices, sound levels, etc. For example, the functional property of a curtain node is a curtain open function (and affects lighting and heat) and its effects on the environment are modeled through the edges in the graph that identify lighting and temperature relationships to the function.

Edges may define relationships between the nodes. Physical and functional edge properties may include the lighting relationship between two location nodes (e.g., light in one area affects lighting in a neighboring room), the temperature relationship between two nodes (e.g., temperature change in one area affects temperature change in a neighboring area, less if there is an insulating wall in the middle), the relationship between geographic locations (e.g., layout of the home, living room is walkable from dining room, but not directly to bathroom as one needs to pass through a corridor node), sound relationships (e.g., music or voice in one area will affect sound in other areas), the relationship between two devices (e.g., a switch may control three bulbs, or a location node is visible from two cameras), etc. For example, when a curtain (a device node) is opened, its lighting effects are modeled by a light property edge that identifies a change in light level of a living room node from light entering from a node representing an outside environment. Behavioral edge properties may be associated with activities (e.g., a person may be working in the dining room but his "usage" of the area would include the adjoining living room). For example, a person may be cooking and the kitchen and dining room would connect for the cooking activity. In another example, a child's cellphone would not have any functional effect on the parent's bedroom and only the authorized owners could have access to the camera feeds in certain locations.

Figure 9A:
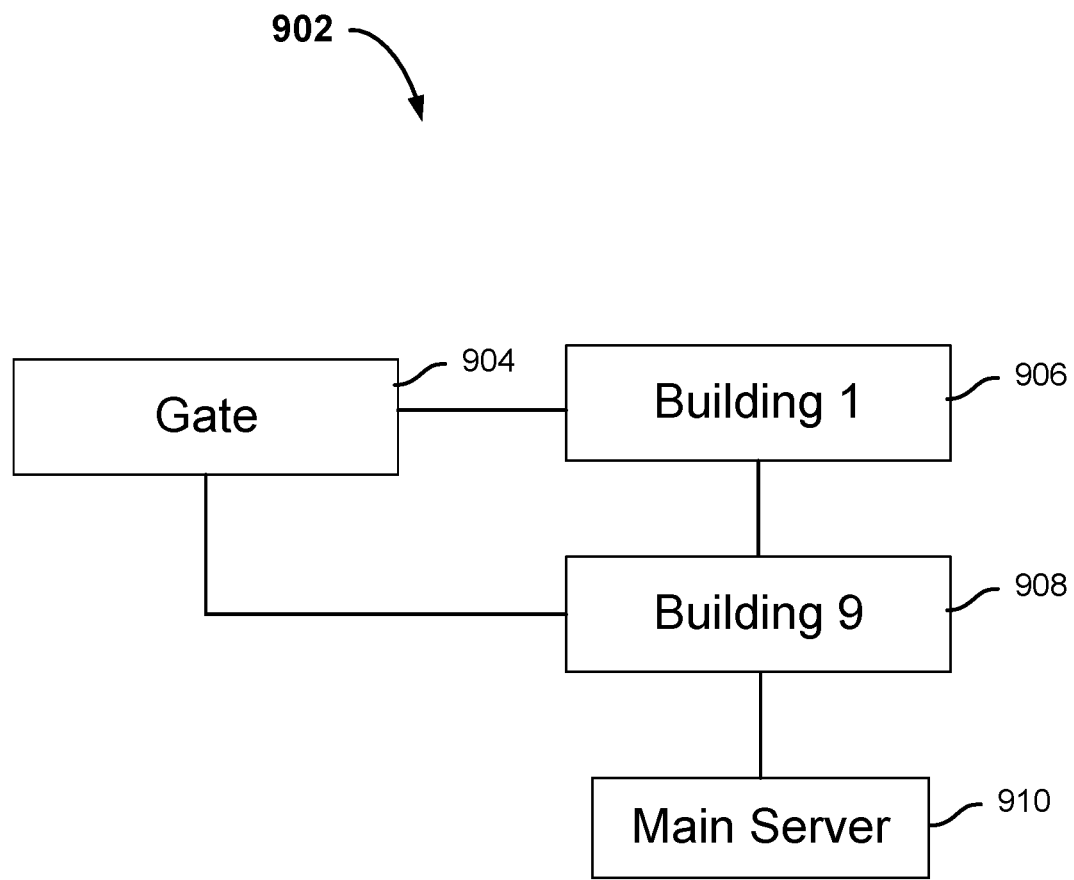
FIG. 9A is a diagram illustrating an example neighborhood level of a hierarchical graph model of a connected device environment.

FIG. 9A is a diagram illustrating an example neighborhood level of a hierarchical graph model of a connected device environment. As shown in the graph model, not only can nodes represent locations/physical buildings, they can represent shared resources and devices of the devices shared by locations/buildings of the level. Graph model level 902 shows nodes 906 and 908 that represent buildings of a neighborhood. Node 904 represents an automatic gate for the neighborhood of the buildings and node 910 represents a server managing device automation for the neighborhood (e.g., server 106 of FIG. 1A). Building node 906 may be associated with properties that describe the physical location coordinate of the building, a geographical orientation of the building, a number of units included in the building, activities that can be performed in association with the building, a height of the building, capabilities of the building, etc. The connections between the nodes (i.e., edges) shown in graph model level 902 represent physical location connections/relationships between the nodes. For example, an edge between the nodes may represent an existence of a physical passage, location association, and/or wire connection. Each edge may be associated with one or more properties. For example, an edge may be associated with a property value that identifies a strength, distance, and/or time value associated with a distance/location between connected nodes. Although graph 902 only shows the physical connection type edges, other types of edges not shown may exist as shown by examples in other figures. For example, a functional type edge identifies a functional connection (e.g., network connection) between nodes (e.g., the graph model identifies a detected connection speed between buildings/servers and the graph model may be utilized to identify the fastest network path between the nodes). In another example, a behavioral type edge identifies a connection that exists for certain types of behavioral activities (e.g., connection based on people, activities, ownership, authorization, privacy, etc.). Graph model level 902 shows one level of the hierarchical graph model and a higher level of the hierarchical graph model may exist. For example, graph model level 902 represents one neighborhood node of a plurality of neighborhood nodes connected together in a higher level of the graph model.

Figure 9B:
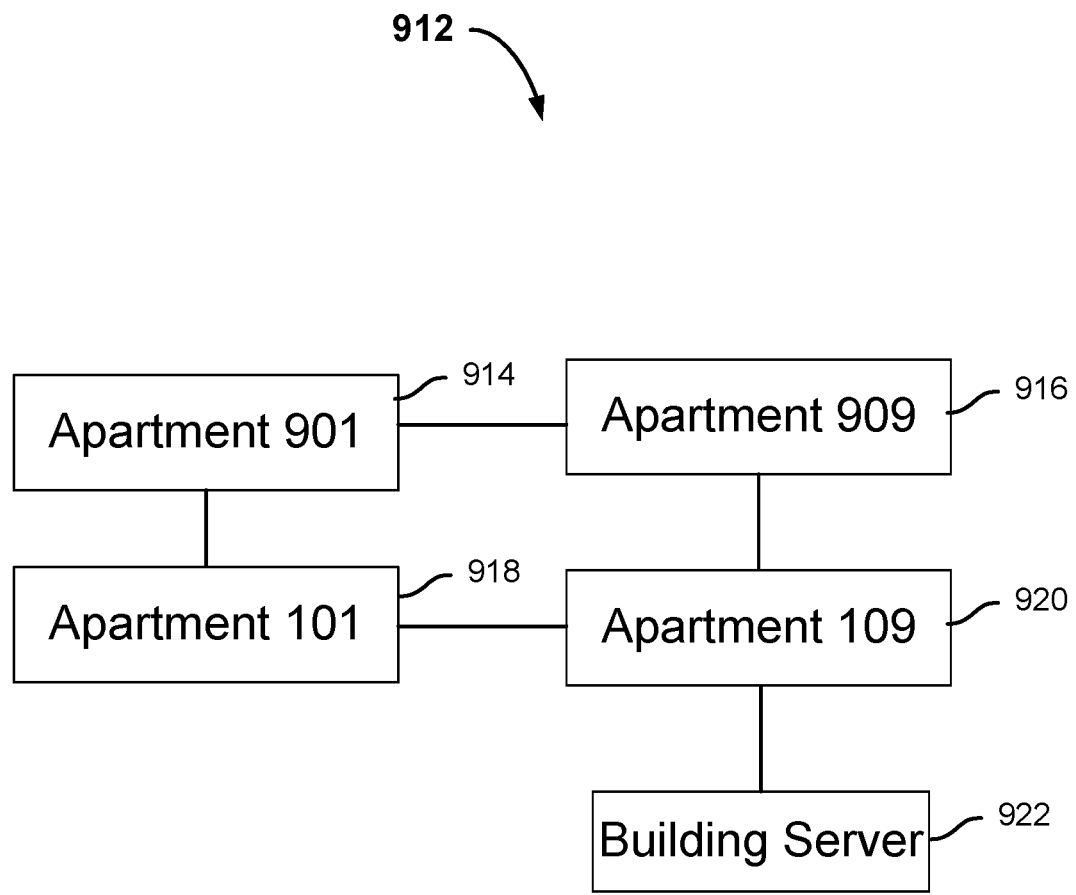
FIG. 9B is a diagram illustrating an example building level of a hierarchical graph model of a connected device environment.

FIG. 9B is a diagram illustrating an example building level of a hierarchical graph model of a connected device environment. Graph model level 912 shown in FIG. 9B represents a lower level of the level shown in FIG. 9A. Specifically, level 912 represents sub nodes and edges of building 906 of FIG. 9A. Nodes 914, 916, 918, and 920 represent apartment units of building 906 of FIG. 9A. The device management server for all of these apartments of the building is represented by node 922. The connections between the nodes shown in graph model level 912 represent physical location connections/relationships between the nodes. Although graph level 912 only shows the physical connection type edges, other types of edges not shown may exist.

Figure 9C:
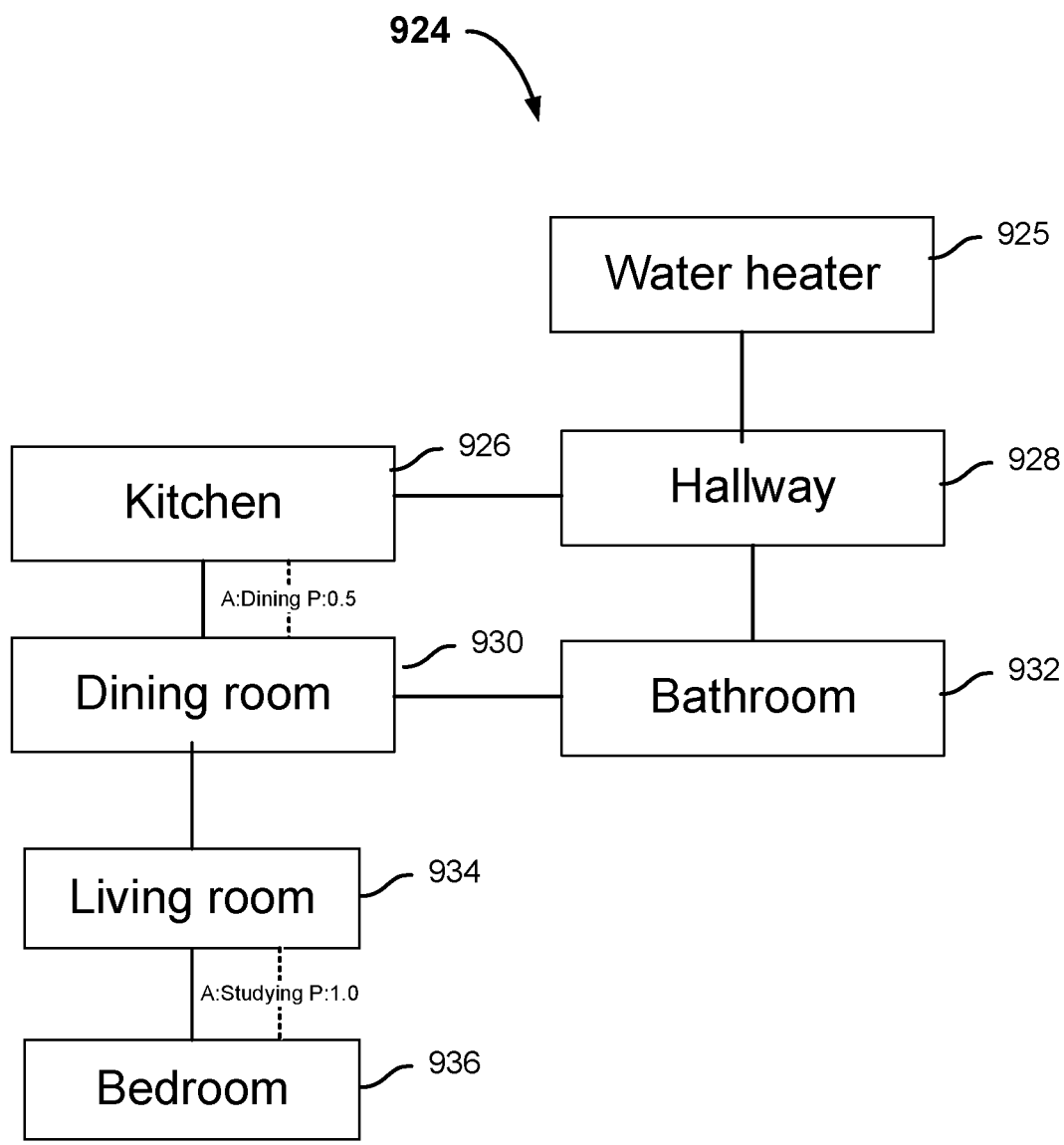
FIG. 9C is a diagram illustrating an example unit level of a hierarchical graph model of a connected device environment.

FIG. 9C is a diagram illustrating an example unit level of a hierarchical graph model of a connected device environment. Graph model level 924 shown in FIG. 9C represents a lower level of the graph level shown in FIG. 9B. Specifically, level 924 represents sub nodes of apartment 918 of FIG. 9B. Not only can nodes represent buildings, units, and devices, they can also represent physical rooms and physical regions. Locations within an apartment unit are represented by nodes 926-936. Water heater node 925 represents a water heater device of the unit. The connections between the nodes shown in graph model level 924 represent physical location connections/relationships between the nodes. Graph level 924 shows the physical connection type edges as solid line connections. Graph level 924 also shows example behavioral type edges as dotted line connections between nodes. The dotted line between kitchen 926 and dining room 930 represents a behavioral connection between the rooms/areas for a particular behavioral activity. This behavioral edge has been associated with a property that identifies that for the dining activity, the privacy between the kitchen and the dining room should be set at a medium privacy setting of value 0.5. This privacy property value may be utilized to adjust the associated devices to maintain a medium level of privacy when it is detected that a dining activity is being performed.

The dotted line between living room 934 and bedroom 936 represents a behavioral connection between the rooms/areas. This behavioral edge has been associated with a property that identifies that for a studying activity, the privacy between the living room and the bedroom should be set at a high privacy setting of value 1.0. This privacy property value may be utilized to adjust associated devices to maintain a high level of privacy between the rooms (e.g., minimize noise) when it is detected that a studying activity is being performed. Behavioral edges may relate to activities of a person and/or animal/pet.

Figure 9D:
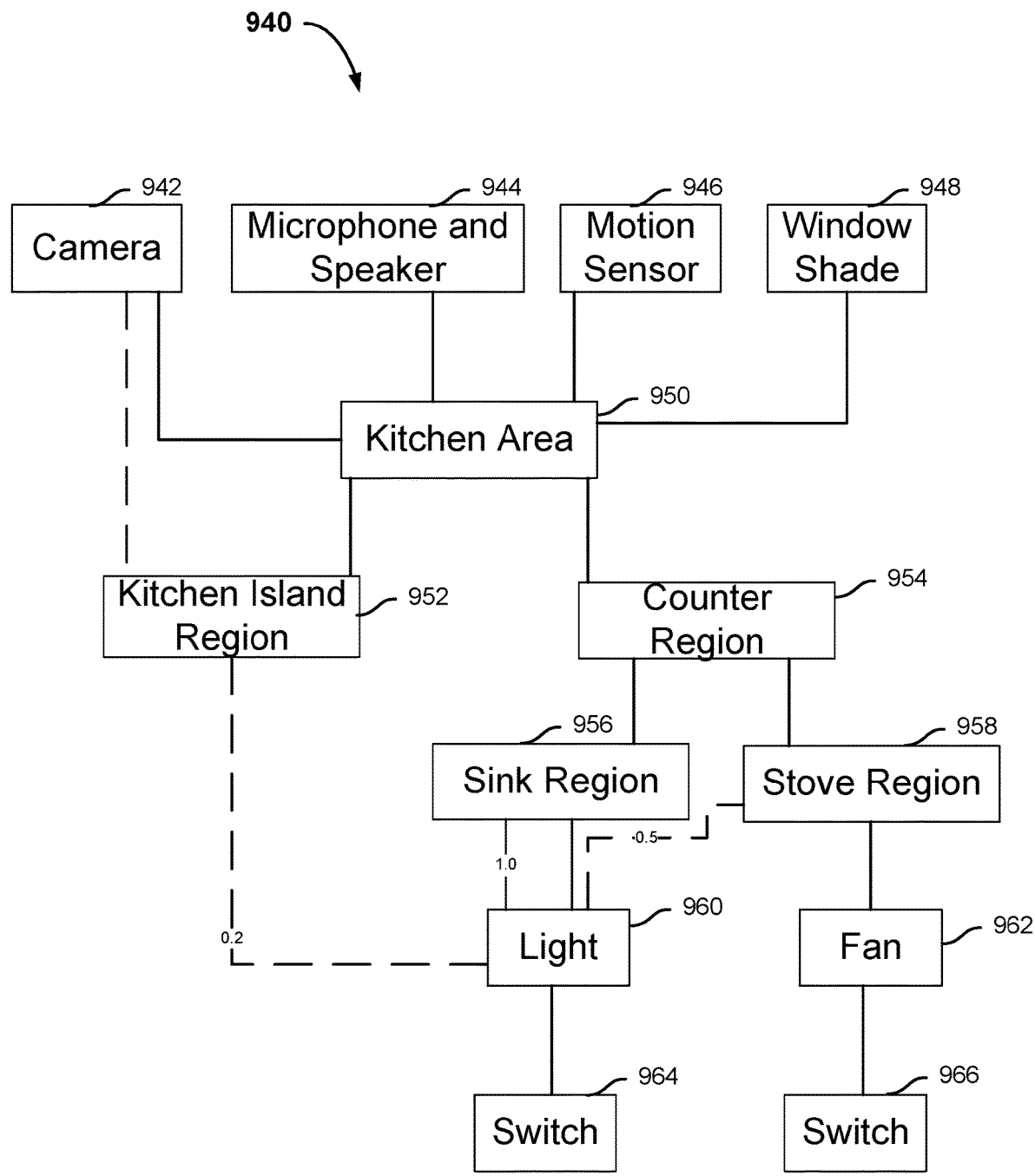
FIG. 9D is a diagram illustrating an example room level of a hierarchical graph model of a connected device environment.

FIG. 9D is a diagram illustrating an example room level of a hierarchical graph model of a connected device environment. Graph model level 940 shown in FIG. 9D represents a lower level of the graph level shown in FIG. 9C. Specifically, graph level 940 represents sub nodes of kitchen 926 of FIG. 9C. Not only can nodes represent devices and unit partitions, they can also represent sub regions of a region. Node kitchen area 950 represents the general kitchen location/region. Kitchen island region 952 and counter region 954 represent sub regions of kitchen area 950. Counter region 954 is further divided into sub regions sink region 956 and stove region 958. Lighting specific to the sink region is represented by light 960 that is controlled by switch 964. A fan specific to the stove region is represented by fan 962 that is controlled by switch 966. A camera in the kitchen is represented by camera 942. A microphone and speaker in the kitchen are represented by module 944. A motion sensor in the kitchen is represented by motion sensor 946. A window shade control device in the kitchen is represented by node 948.

The solid edge connection lines between the nodes shown in graph model level 940 represent physical location connections/relationships between the nodes. For example, camera 942 is connected to kitchen area 950 for being installed/mounted in the region of the kitchen area. The dashed edge connection lines between the nodes in graph model level 940 represent functional connections/relationships between the connected nodes. For example, the functional edge between camera 942 to kitchen island region 952 identifies that the image capture function of the camera is able to capture an image of at least a region of kitchen island region 952. A property associated with this edge may identify the exact portion of the kitchen island region that is able to be captured by the camera. Additionally, dashed edge connections between light 960 and kitchen island region 952, sink region 956, and stove region 958 identify that the luminescence function of the light reaches the connected regions. Each of these functional edges is associated with a property that identifies a measure of intensity of the light that reaches each connected region. The functional edge to sink region 956 is identified with the property intensity value "1.0" to indicate a strong luminescence, the functional edge to stove region 958 is identified with the property intensity value "0.5" to indicate a medium luminescence, and the functional edge to kitchen island region 952 is identified with the property intensity value "0.2" to indicate a low luminescence. Another example of a functional edge includes an audio/sound relationship between nodes.

Figure 10:
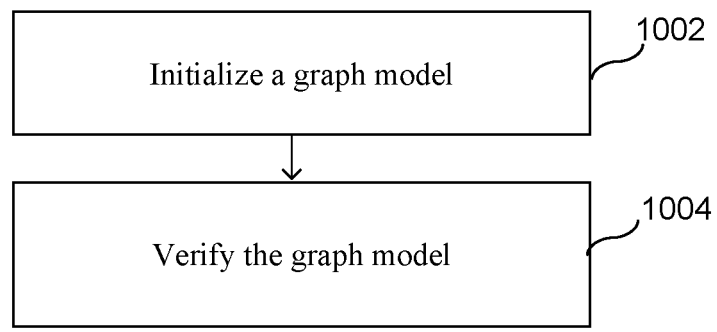
FIG. 10 is a flowchart illustrating an embodiment of a process for initializing a graph model of a connected device environment.

FIG. 10 is a flowchart illustrating an embodiment of a process for initializing a graph model of a connected device environment. The process of FIG. 10 may be at least in part implemented on hub 104 and/or server 106 of FIG. 1A. In some embodiments, the graph model is the graph model stored in hub 104 and/or server 106 of FIG. 1A. In some embodiments, an example of the graph model is the graph model of FIGS. 9A-9D.

At 1002, a graph model is initialized. In some embodiments, initializing a graph model includes establishing a graph model for a connected device environment to be established. For example, a user specifies devices/sensors and their locations and connections within an environment to build the graph model. In some embodiments, initializing the graph model includes receiving a specification of the graph model. For example, using software, a user specifies a configuration of an environment including regions and connected devices within the environment.

Graph models may vary across different installation environment and different homes. However the machine learning may be utilized to apply at least a portion of a graph from one installation environment to another installation environment. For example, patterns in the graph model may be found and applied to various installation environments, so that the learning from one home can be transferred across to another home. In other words, the machine learning is utilized to identify behaviors/processes across similar parts of the graph model and thus generates common rules across different installation environments and graph models.

In some embodiments, one or more templates are utilized to initialize the graph model. For example, a user is provided prebuilt graph model templates and the user is able to adjust and combine templates as needed to specify at least a portion of the graph model instance. In some embodiments, network connected devices are to be deployed across very similar and/or same environments. For example, multiple buildings/apartment units may be based on the same layout and an installer has determined the types and specific installation locations of network connected devices and sensors to be installed and duplicated in each unit. Because the design has been standardized, a graph model template may be generated for the same/similar unit and applied across all same/similar units. In another example, graph model templates for environment portions (e.g., rooms, regions, etc.) may be available to use to build a graph model for the deployment environment. The graph model template may be customizable for each deployment instance. For example, when using a graph model template, elements of the template may be modified/specified to account for deviations/variations of each unit.

In some embodiments, initializing the graph model includes associating specific physical devices to representative nodes in the graph model. For example, although a template graph model includes placeholders for devices/sensors in the template graph model, the device/sensor nodes have not been specifically associated with real world deployed/installed devices/sensors and the user/installer may specify identifiers of specific real world devices/sensors for these placeholders. In the example where network connected devices are to be deployed across similar units, an installer may install physical sensors/devices in each unit based on the graph model template for the unit. In some embodiments, based on a graph model template, the physical sensors/devices are associated with nodes in the graph model template automatically. For example, each sensor/device performs one or more tests in conjunction with other sensors/devices to determine the corresponding graph model node of the sensor/device. In one example, if there are two light bulbs device nodes in the graph model template and two network connected light bulbs have been installed in the environment, it is required to determine which physical light bulb corresponds to which light bulb node in the graph model template. In this example, one of the light bulbs is turned on while the other is turned off and feedback data from sensors in the deployed environment is utilized to deduce the location of the turned on light bulb and its corresponding node and the node of the turned off light bulb is identified by process of elimination.

In some embodiments, properties of nodes and/or edges of the graph model are varied based on a location and/or orientation of a unit. For example, an apartment unit on a third floor of a building has different privacy concerns as compared to a first floor unit and a privacy property setting value associated with a window treatment device node and/or edges connecting the node is modified based on the location and/or orientation of the environment. In another example, an amount of sunlight and/or noise that enters through a window may vary based on the direction/orientation of a window and a property setting value associated with a window treatment device and/or its edges is modified based on the location and/or orientation of the associated window.

At 1004, the graph model is verified. For example, automatic tests are performed to ensure that a correct graph model has been initialized for the deployment environment (e.g., closed loop verification). In some embodiments, automatic verification is performed by performing one or more tests (e.g., test to ensure each physical device/sensor is associated with correct corresponding node in the graph model). For example, for each controllable device/sensor, one or more controllable properties are activated and their effects are detected using the sensor to determine whether the detected effects are as expected according to the graph model. In one example, when an environment affecting device (e.g., sound, light, etc.) is instructed to be turned on, the sensors that should be able to detect its effects according to the graph model (e.g., according to edges between corresponding nodes) should detect the effects if the graph model is correct. In some embodiments, a user/installer is instructed to perform one or more actions (e.g., walk a specific path, turn on switch, etc.) and the sensors of the environment are utilized to verify that detected data fits with the graph model. In the event an error is detected, the error may be fixed automatically (e.g., switch device association between two nodes) and/or an error message may be provided to allow a user/installer to correct the error.

In some embodiments, using the graph model, one or more devices/sensors are verified periodically. For example, sensors/devices may fail during use and correct functioning of devices/sensors is verified periodically by using the graph model to identify for a device/sensor being tested, which other devices/sensors are able to detect/affect the device/sensor being tested and verify that these devices/sensors are able to detect the correct operation of the function of the device/sensor being tested. In some embodiments, periodic verification is utilized to detect maintenance issues. For example, verification tests for certain common maintenance issues may be performed periodically based on the graph model.

In some embodiments, by using the graph model, most efficient sensor/device placement locations and/or locations of any additional sensors/devices required to provide desired coverage may be identified. For example, based on a desired set of rules and/or functions desired to be enabled in an environment, the graph model may be analyzed to identify where additional nodes can be placed in the graph model (with which associated properties), where a node can be eliminated, and/or which property values of edges can be modified (e.g., improve quality). The result of the analysis may then be implemented in the physical environment to achieve the desired coverage.

Figure 11:
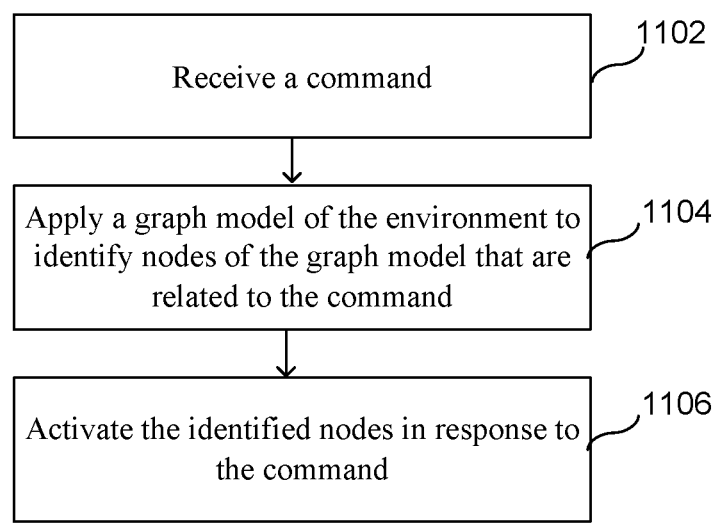
FIG. 11 is a flowchart illustrating an embodiment of a process for using a graph model to process a command.

FIG. 11 is a flowchart illustrating an embodiment of a process for using a graph model to process a command. The process of FIG. 11 may be at least in part implemented on hub 104 and/or server 106 of FIG. 1A. In some embodiments, the graph model is the graph model stored in hub 104 and/or server 106 of FIG. 1A. In some embodiments, an example of the graph model is the graph model of FIGS. 9A-9D. In some embodiments, at least a portion of the process of FIG. 11 is included in 204, 206, 208, 314, 316 and/or 318 of FIGS. 2-3, 404 of FIGS. 4, 502 and/or 504 of FIG. 5, 604 of FIG. 6, and/or 1004 of FIG. 10.

At 1102, a command is received. In some embodiments, the command is a user command. For example, a user activates a switch or provides an instruction. The user command may be a voice command detected by a microphone. In some embodiments, the command is an automation command (e.g., invoked based on preset or automatically determined rules). In some embodiments, the command is detected. For example, a sensor has been triggered. In some embodiments, the command is not an explicit user command. For example, the command is automatically invoked based on sensor detected environmental properties. In some embodiments, the command is an invocation of a rule. In some embodiments, the command is a discovery of a new rule. In some embodiments, the command is a test command to test an aspect of a device/sensor.

At 1104, a graph model of the environment is applied to identify nodes of the graph model that are related to the command. For example, the graph model specifies relationships between devices/sensors as well as physical regions and this relationship information is utilized to identify the related devices/sensors as well as their command related relationships. In some embodiments, the identified nodes are a subset of all nodes of the graph model. In some embodiments, the identifying the nodes includes identifying a node directly associated with the command (e.g., node corresponding to a device specified by the command) and then determining nodes that are connected to the identified node with a relationship that is associated with the command. For example, when a command to open a garage door is received, the node corresponding to a garage door opener is identified in the graph model and then other nodes connected to the garage door opener node with a command related relationship are identified (e.g., identify all lighting related nodes that are able to illuminate a garage area of the garage door opener to turn on related lights). In some embodiments, the graph model is hierarchical and the command may relate to one or more levels of the graph hierarchy. For example, nodes/edges of a lower level inherit properties from a directly corresponding higher level node.

In some embodiments, identifying the nodes includes identifying a node associated with a physical area/region of the command. For example, the command is associated with a physical area/region (e.g., turn on lights in the kitchen command) and the node of the graph model associated with the physical area/region is identified. Then other nodes that are connected to the physical area/region and also associated with the command can be identified based on graph model edge connections of the other nodes with the physical area/region. The physical area/region may be directly specified in the command and/or inferred (e.g., location of a user that provided the command). The physical area/region may be a room, a location within a room, a unit, a building, an outdoor location, a sub region, a location surrounding a specific item, and/or any other identifiable location.

In some embodiments, by using context information of the graph, more generalized and intuitive commands are able to be utilized than otherwise without context information of the graph. For example, rather than requiring a user to know specific device names and configurations of devices, the user is able to provide a command in relation to location and/or relationship concepts of the graph model. Based on the identified location/relationship, the applicable devices/nodes are able to be automatically determined. Additionally, the context information allows more generalized and context aware rules to be automatically discovered. For example, without the location context information of the graph model, state inputs utilized during rule discovery/use exist in isolation. However, with the location context information of the graph model, an input state can be generalized (e.g., to a wider region/area rather than only for a specific device) based on the context information to discover/utilize rules for the generalized area/region (e.g., discover rules for how devices in a kitchen should behave vs. prior limited discovery of rules for only specific devices). By allowing more generalized rules to be discovered, invoked, and/or utilized, rules become applicable in more situations and locations. For example, a rule specific to a particular user but generalized to a broader area/region may be applied in different environments as the particular user travels to different environments with different graph models but with a same labeled area/region (e.g., rule to turn on lights at night when the user enters a kitchen area can be applied across all kitchens visited by the user even though actual light devices and their configurations are different across different kitchens). In some embodiments, by allowing actions to be generalized to broader concepts using the graph model (e.g., generalized to broader location context), rule discovery may take place across various different types of deployment environments (e.g., by same user and/or different users).

In some embodiments, the graph model includes edges (e.g., connections between nodes) that identify a physical relationship between the nodes and these edges are utilized in identifying the nodes. For example, these types of edges and any associated property (e.g., magnitude value) that identifies physical location/relationship between nodes (e.g., devices/sensors, location areas, etc.) are utilized in processing the command. The location of devices/sensors and their physical relationships to one another may be utilized to identify nodes that are relevant to processing the command and/or provide physical context in processing information of the nodes. For example, location triangulation is performed to identify a location of an event by processing camera and/or microphone data of multiple sensors given their known respective locations with each other. In another example, the location information allows joint control of physically co-located devices/sensors based on physical relationships identified in the graph model without requiring exact knowledge of all of the specific devices affected (e.g., command to turn on all lights in a particular region). In some embodiments, the location information of sensor placement is utilized to determine whether a detected movement of the sensor is associated with a human user or a pet. For example, a sensor mounted low to the ground may detect human and pet movement while a sensor mounted high and away from detecting low ground movements is less likely to detect pet movement.

In some embodiments, the physical relationships of the nodes provide outdoor environment context. For example, the graph model captures a relationship between an outdoor weather, time/date of day, and/or sun position. In one example, based on a location/position/orientation of a window and the time and solar position information at least in part obtained using the graph model, an expected amount of sunlight entering the window is determined and utilized to determine whether a thermostat near the window is correctly measuring an indoor temperature or is abnormally affected by direct sunlight shining on the thermostat. If multiple temperature sensors exist, the one that is most likely accurate may be selected for use. In another example, a bathroom fan can efficiently control humidity of the bathroom using graph model data by detecting whether a high humidity is only detected in the bathroom (e.g., due to a user bathing) or an entire apartment unit is humid (e.g., detected at a sensor located at a sufficiently remote location from the bathroom as determined using the graph model) and the bathroom fan is only turned on when a sufficient humidity difference is detected between the bathroom sensor and the remote sensor.

In some embodiments, the graph model includes edges that identify functional relationships between the nodes and these edges are utilized in identifying the nodes. For example, these types of edges and any associated property (e.g., function identification and magnitude value of connection) that identifies functional relationships between nodes are utilized in processing the command. Examples of the functional relationships include light and sound relationships. For example, amount of light and/or noise outputted/controlled by a node that affects another node is represented as an edge connection with an associated magnitude value. In one example, when a user provides commands to make a room darker, the location of the user is determined and all of the nodes connected to the location with a functional edge identifying a light relationship are identified and instructed to reduce the light output.

In some embodiments, the graph model includes edges that identify behavioral relationships between the nodes and these edges are utilized in identifying the nodes. For example, these types of edges and any associated property (e.g., behavioral activity identification, associated property of the activity, and magnitude value of connection) that identifies behavioral activity relationships between nodes are utilized in processing the command. Examples of the behavioral activity relationships include relationships associated with activities/behaviors of people (e.g., activity, ownership, authorization, privacy, etc. of human users) and/or animals/pets. For example, each behavioral relationship type edge is specific to a specified activity (e.g., working, dining, studying, TV watching, bathing, etc.) and each behavioral relationship type edge is only applicable for the specified activity. Different contexts and behavioral activities may result in different device settings. For example, a reading activity may give rise to a bright light setting while a sleeping activity may give rise to a low brightness setting.

In some embodiments, an activity associated with the command is determined and identifying the nodes of the graph model that are related to the command includes identifying edges for the determined activity. For example, it is detected that a user is sleeping and privacy/light edges associated with the sleeping activity are identified and utilized to adjust devices accordingly based on the identified edges that are connected to the user's location in the graph model. In another example, one or more behavioral edges are associated with one or more particular users and/or types of users and allow enabling/disabling of functionality based on whether an authorized user and/or type of user provided the command and/or is detected.

At 1106, the identified nodes are activated in response to the command. For example, a desired result of the command is achieved by enabling/disabling one or more features (e.g., modify states) of the appropriate identified nodes. In some embodiments, activating the nodes includes turning on/off a device/sensor of one or more of the identified nodes. In some embodiments, activating the nodes includes determining one or more states of the identified nodes. For example the states can be used to learn and/or activate one or more rules. In some embodiments, activating the nodes includes modifying one or more device settings. In some embodiments, activating the nodes includes determining one or more related edges and/or nodes of the identified nodes. In some embodiments, activating the nodes includes evaluating sensor data. In some embodiments, activating the nodes includes modifying the graph model based on the identified nodes. For example, one or more properties of nodes and/or edges may be modified or one or more nodes/edges may be added or removed from the graph model. In some embodiments, activating the nodes includes determining how each node relates to the command and how each node should be invoked, if applicable, to process the command and invoking the appropriate nodes. In some embodiments, activating the nodes includes identifying one or more rules associated with the command and the identified nodes and invoking the identified rules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device controller system, comprising:
a communication interface coupled to one or more controllable devices; and
a processor coupled to the communication interface and configured to:
receive a plurality of inputs, wherein a respective input identifies an associated state of the input;
evaluate a plurality of output candidates based on states associated with the received inputs, wherein a respective output candidate is associated with an output handling type;
select an output candidate from the plurality of output candidates based on the evaluation outcome, wherein the selected output candidate specifies a selected configuration setting of a property of a controllable device;
implement the selected output candidate based on the output handling type associated with the selected output candidate, wherein the output handling type specifies whether to perform an action automatically or perform the action subject to a user interactive qualification.

2. The system of claim 1, wherein performing the action includes changing the property of the controllable device to be a specific configuration associated with the action.

3. The system of claim 1, wherein the plurality of inputs comprise one or more of: sensor information, user information, and environmental information.

4. The system of claim 1, wherein evaluating the output candidates comprises evaluating the output candidates according to an optimization function.

5. The system of claim 4, wherein the processor is further configured to:
receive a feedback subsequent to implementing the selected output candidate; and
update optimization parameters associated with the optimization function based on the received feedback.

6. The system of claim 1, wherein evaluating the output candidates comprises evaluating, for each output candidate, a measure of expected desirability of the output candidate for each of at least a portion of the received inputs.

7. The system of claim 1, wherein the processor is further configured to:
determine a desired configuration setting candidate based on the received inputs; and
evaluate output handling types for the desired configuration setting candidate to select an output handling type associated with the desired configuration setting candidate.

8. A computer-implemented method, comprising:
receiving a plurality of inputs, wherein a respective input identifies an associated state of the input;
evaluating a plurality of output candidates based on states associated with the received inputs, wherein a respective output candidate is associated with an output handling type;
selecting an output candidate from the plurality of output candidates based on the evaluation outcome, wherein the selected output candidate specifies a selected configuration setting of a property of a controllable device;
implementing the selected output candidate based on the output handling type associated with the selected output candidate, wherein the output handling type specifies whether to perform an action automatically or perform the action subject to a user interactive qualification.

9. The method of claim 8, wherein performing the action includes changing the property of the controllable device to be a specific configuration associated with the action.

10. The method of claim 8, wherein the plurality of inputs comprise one or more of: sensor information, user information, and environmental information.

11. The method of claim 8, wherein evaluating the output candidates comprises evaluating the output candidates according to an optimization function.

12. The method of claim 11, wherein the method further comprises:
receiving a feedback subsequent to implementing the selected output candidate; and
updating optimization parameters associated with the optimization function based on the received feedback.

13. The method of claim 8, wherein evaluating the output candidates comprises evaluating, for each output candidate, a measure of expected desirability of the output candidate for each of at least a portion of the received inputs.

14. The method of claim 8, further comprising:
determining a desired configuration setting candidate based on the received inputs; and evaluating output handling types for the desired configuration setting candidate to select an output handling type associated with the desired configuration setting candidate.

15. A non-transitory computer readable storage medium storing instructions, which when executed by a processor causes the processor to perform a method, the method comprising:
receiving a plurality of inputs, wherein a respective input identifies an associated state of the input;
evaluating a plurality of output candidates based on states associated with the received inputs, wherein a respective output candidate is associated with an output handling type;
selecting an output candidate from the plurality of output candidates based on the evaluation outcome, wherein the selected output candidate specifies a selected configuration setting of a property of a controllable device;
implementing the selected output candidate based on the output handling type associated with the selected output candidate, wherein the output handling type specifies whether to perform an action automatically or perform the action subject to a user interactive qualification.

16. The non-transitory computer readable storage medium of claim 15, wherein performing the action includes changing the property of the controllable device to be a specific configuration associated with the action.

17. The non-transitory computer readable storage medium of claim 15, wherein the plurality of inputs comprise one or more of: sensor information, user information, and environmental information.

18. The non-transitory computer readable storage medium of claim 15, wherein evaluating the output candidates comprises evaluating the output candidates according to an optimization function.

19. The non-transitory computer readable storage medium of claim 15, wherein evaluating the output candidates comprises evaluating, for each output candidate, a measure of expected desirability of the output candidate for each of at least a portion of the received inputs.

20. The non-transitory computer readable storage medium of claim 15, wherein the method further comprises:
determining a desired configuration setting candidate based on the received inputs; and
evaluating output handling types for the desired configuration setting candidate to select an output handling type associated with the desired configuration setting candidate.

* * * * *